US012812361B2

(12) United States Patent
Chaugule et al.

(10) Patent No.: US 12,812,361 B2
(45) Date of Patent: Nov. 24, 2026

(54) SOURCE DEVICE CROSS PLATFORM ESIM PROFILE TRANSFER

(71) Applicant: Apple Inc., Cupertino, CA (US)

(72) Inventors: Raj S Chaugule, Santa Clara, CA (US); Hyewon Lee, Cupertino, CA (US); Jean-Marc Padova, San Francisco, CA (US); Li Li, Saratoga, CA (US); Rohan C Malthankar, San Jose, CA (US); Sherman X Jin, Santa Clara, CA (US); Suraj Gupta, Santa Clara, CA (US); Xiangying Yang, Cupertino, CA (US); Zexing Shi, Cupertino, CA (US)

(73) Assignee: Apple Inc., Cupertino, CA (US)

(*) Notice: Subject to any disclaimer, the term of this patent is extended or adjusted under 35 U.S.C. 154(b) by 160 days.

(21) Appl. No.: 18/824,522

(22) Filed: Sep. 4, 2024

(65) Prior Publication Data

US 2025/0080970 A1 Mar. 6, 2025

Related U.S. Application Data

(60) Provisional application No. 63/580,852, filed on Sep. 6, 2023.

(51) Int. Cl.
*H04W 8/20* (2009.01)
*H04L 9/32* (2006.01)

(52) U.S. Cl.
CPC ............ *H04W 8/20* (2013.01); *H04L 9/3226* (2013.01)

(58) Field of Classification Search
CPC ....... H04W 8/20; H04W 12/06; H04W 12/35; H04W 8/205; H04L 9/3226
USPC .......................................................... 455/418
See application file for complete search history.

(56) References Cited

U.S. PATENT DOCUMENTS

| | | | | |
|---|---|---|---|---|
| 10,187,784 | B1 | 1/2019 | Chen et al. | |
| 10,856,137 | B2 * | 12/2020 | Li | H04W 8/18 |
| 11,146,948 | B1 * | 10/2021 | Uehling | H04W 12/30 |
| 12,457,487 | B2 * | 10/2025 | Park | H04W 8/205 |
| 2021/0011737 | A1 | 1/2021 | Yu et al. | |
| 2021/0112402 | A1 * | 4/2021 | Ullah | H04W 12/0471 |
| 2023/0171585 | A1 | 6/2023 | Padova et al. | |

OTHER PUBLICATIONS

Abdou, "Commercializing eSIM for Network Operators", 2019 IEEE 5th World Forum on Internet of Things (WF-IoT), Apr. 15, 2019, 6 sheets.
GSM Association, "Embedded SIM Remote Provisioning Architecture Version 4.2", Jul. 9, 2020, 113 sheets.

* cited by examiner

*Primary Examiner* — Huy C Ho
(74) *Attorney, Agent, or Firm* — Fay Kaplun & Marcin, LLP

(57) ABSTRACT

An apparatus configured to engage in an embedded subscriber identity module (eSIM) profile transfer process to transfer an eSIM profile from a source device executing a first operating system (OS) that implements a first protocol stack related to eSIM profile transfers to a target device executing a second OS that implements a second protocol stack related to eSIM profile transfers, wherein the first protocol stack and the second protocol stack are different, process, based on signaling received from an entitlement server, a token for transferring the eSIM profile and generate, for transmission to the target device, a message comprising the token.

20 Claims, 18 Drawing Sheets

Network Arrangement 100

Call Flow 500

Call Flow 600

Call Flow 900

Method 1000

Call Flow 1300

Call Flow 1700

SOURCE DEVICE CROSS PLATFORM ESIM PROFILE TRANSFER

PRIORITY/INCORPORATION BY REFERENCE

This application claims priority to U.S. Provisional Application Ser. No. 63/580,852 filed on Sep. 6, 2023, entitled "Source Device Cross Platform eSIM Profile Transfer," the entirety of which is incorporated by reference herein.

BACKGROUND

Existing implementations of User Equipment (UE) embedded subscriber identity module (eSIM) operations have several areas in need of improvement. Users may switch their eSIM between UEs operating with different operating systems (i.e., different platforms). Swapping physical SIM cards between platforms is a straightforward process; swapping eSIMs is less so. Enhanced interoperability between Global System for Mobile communications Association (GSMA) and Manufacturer-Specific Protocol (MSP) eSIM implementations are needed in the field.

SUMMARY

Some example embodiments are related to an apparatus having processing circuitry configured to engage in an embedded subscriber identity module (eSIM) profile transfer process to transfer an eSIM profile from a source device executing a first operating system (OS) that implements a first protocol stack related to eSIM profile transfers to a target device executing a second OS that implements a second protocol stack related to eSIM profile transfers, wherein the first protocol stack and the second protocol stack are different, process, based on signaling received from an entitlement server, a token for transferring the eSIM profile and generate, for transmission to the target device, a message comprising the token.

Other example embodiments are related to method including engaging in an embedded subscriber identity module (eSIM) profile transfer process to transfer an eSIM profile from a source device executing a first operating system (OS) that implements a first protocol stack related to eSIM profile transfers to a target device executing a second OS that implements a second protocol stack related to eSIM profile transfers, wherein the first protocol stack and the second protocol stack are different, processing, based on signaling received from an entitlement server, a token for transferring the eSIM profile and generating, for transmission to the target device, a message comprising the token.

DETAILED DESCRIPTION

Figure 1:
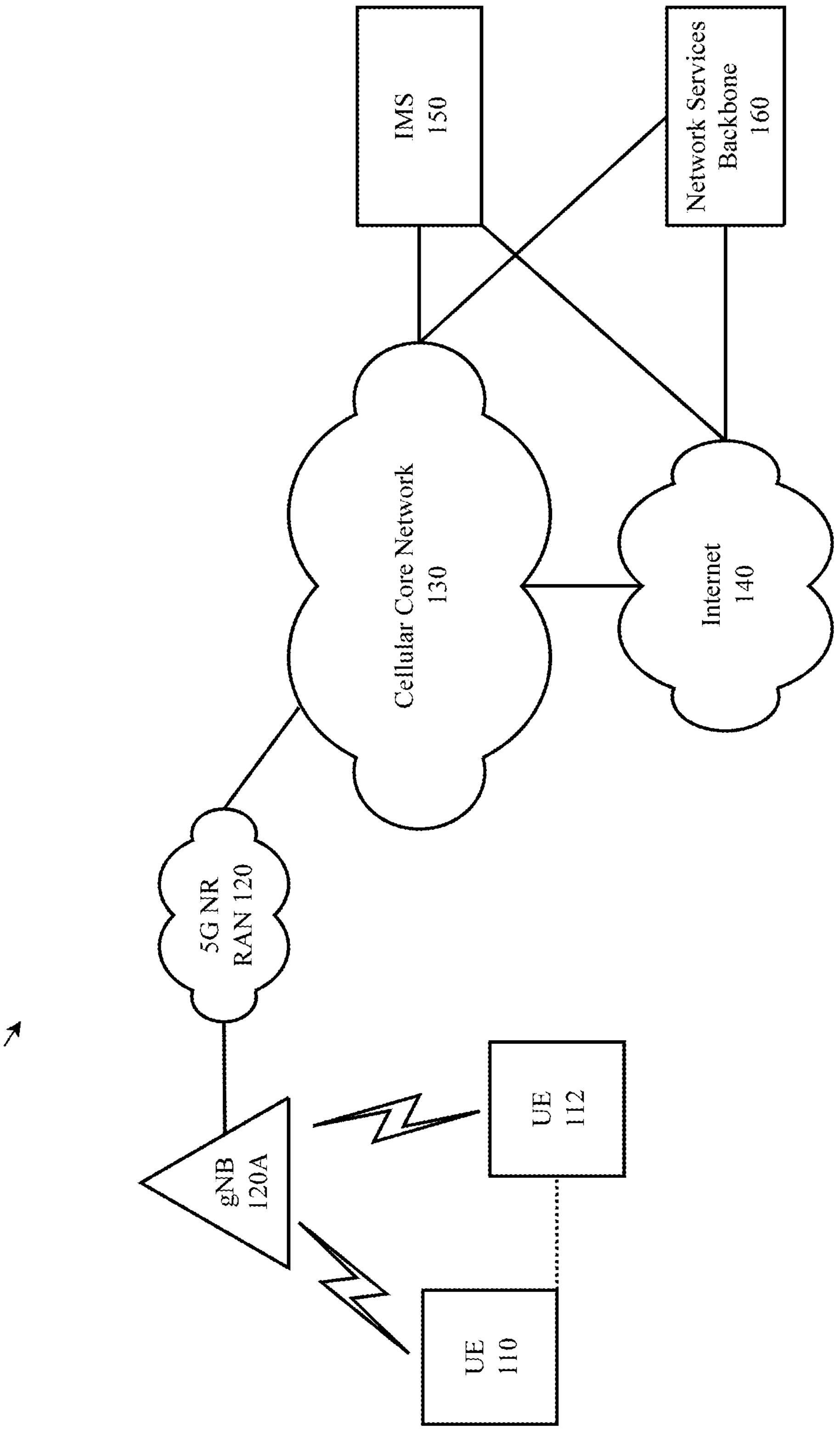
FIG. 1 shows an example network arrangement according to various example embodiments.

The example embodiments may be further understood with reference to the following description and the related appended drawings, wherein like elements are provided with the same reference numerals. The example embodiments relate to cross platform eSIM profile transfers.

The example embodiments are described with regard to a user equipment (UE). However, reference to a UE is merely provided for illustrative purposes. The example embodiments may be utilized with any electronic component that may establish a connection to a network and is configured with the hardware, software, and/or firmware to exchange information and data with the network. Specifically, the example embodiments may be used with any electronic component that supports eSIM operations. Therefore, the UE as described herein is used to represent any electronic component.

The example embodiments are also described with reference to a 5G New Radio (NR) network. The example embodiments may also be implemented in other types of networks, including but not limited to LTE networks, future evolutions of the cellular protocol (e.g., 5G-advanced, 6G, etc.), or any other type of network. In some of the examples, it will be considered that the example UE receives eSIM profiles and other information using the 5G network. However, the UE may receive the eSIM profiles and other information via any wired or wireless network.

The example embodiments are also described with reference to a subscription manager data preparation+ (SM-DP+) service that is a network element (typically a server) that prepares, stores, and protects carrier profiles (including operator credentials). However, the nomenclature SM-DP+ is only example and other entities may refer to a device, component or function performing the functionality of the SM-DP+ as described herein using different terminology.

The example embodiments are also described with reference to a "source" and a "target." The term "source" may be a UE that currently includes an eSIM profile that is to be transferred. The term "target" may be a UE to which the eSIM profile is to be transferred.

Some of the example embodiments are also described with reference to the source and target having different operating systems (OSs). Examples of OSs for source and target devices include iOS distributed by Apple Inc., Android distributed by Google Inc., etc. However, the example embodiments may be used by source and target devices operating on any OS.

Furthermore, in some of the example embodiments, source and target devices having different OSs may implement different protocol stacks for eSIM profile transfer. For example, one OS may implement a standardized stack and another OS may implement an MSP stack. In one example, a standardized stack may be a GSMA Permanent Reference Document TS.43 protocol stack, hereinafter referred to as a GSMA stack or a TS.43 stack. However, the example embodiments may be used by source and/or target devices that implement other types of standardized stacks. The reference to a GSMA OS, GSMA stack, TS.43 OS or TS.43 stack refers to an OS that implements any type of standardized stack. In addition, reference to these terms does not mean that the OS is owned, distributed or has any affiliation whatsoever with GSMA, merely that the OS implements a GSMA compliant stack for eSIM profile transfer.

The example embodiments describe various dual-stack (e.g., GSMA and MSP) solutions for eSIM profile transfers. The example embodiments illustrate various operations and logic related to conditional transfer tokens, platform signaling, nonce generation, signed blobs, third-party applications (3PAs), secure connection generation, and Quick Response (OR) based transfer mechanisms. Further details on these various embodiments will be discussed below with respect to the various call flows described herein.

FIG. 1 shows an example network arrangement 100 according to various example embodiments. The example network arrangement 100 includes two UEs 110 and 112. The UEs 110 and 112 may be any type of electronic component that is configured to communicate via a network, e.g., mobile phones, tablet computers, desktop computers, smartphones, phablets, embedded devices, wearables, Internet of Things (IoT) devices, etc. An actual network arrangement may include any number of UEs being used by any number of users. In the example of FIG. 1, the UE 112 may utilize a different operating system (OS) or eSIM protocol from the UE 110 and may operate on a different cellular carrier than the UE 110. The UE 110 and the UE 112 may also associate with one another directly using a short-range communication connection such as Bluetooth, Wi-Fi Direct, Near Field Communication (NFC), cellular sidelink (SL), etc. Thus, the example of two UEs 110 and 112 is merely provided for illustrative purposes.

The UEs 110 and 112 may be configured to communicate with one or more networks. In the example of the network configuration 100, the network with which the UEs 110 and 112 may wirelessly communicate is a 5G NR radio access network (RAN) 120. The UEs 110 and 112 may also communicate with other types of networks (e.g., 5G cloud RAN, a next generation RAN (NG-RAN), a legacy cellular network, etc.) and the UEs 110 and 112 may also communicate with networks over a wired connection. With regard to the example embodiments, the UEs 110 and 112 may establish a connection with the 5G NR RAN 120. Therefore, the UEs 110 and 112 may have a 5G NR chipset to communicate with the NR RAN 120.

The 5G NR RAN 120 may be portions of a cellular network that may be deployed by a network carrier (e.g., Verizon, AT&T, T-Mobile, etc.). The RAN 120 may include cells or base stations that are configured to send and receive traffic from UEs that are equipped with the appropriate cellular chip set. In this example, the 5G NR RAN 120 includes the gNB 120A. However, reference to a gNB is merely provided for illustrative purposes, any appropriate base station or cell may be deployed (e.g., Node Bs, eNodeBs, HeNBs, eNBs, gNBs, gNodeBs, macrocells, microcells, small cells, femtocells, etc.).

Any association procedure may be performed for the UEs 110 and 112 to connect to the 5G NR RAN 120. For example, as discussed above, the 5G NR RAN 120 may be associated with a particular network carrier where the UE 110 and/or the UE 112 and/or the users thereof has a contract and credential information (e.g., stored on a SIM card or eSIM). Upon detecting the presence of the 5G NR RAN 120, the UEs 110 and 112 may transmit the corresponding credential information to associate with the 5G NR RAN 120. More specifically, the UEs 110 and 112 may associate with a specific cell (e.g., gNB 120A).

The network arrangement 100 also includes a cellular core network 130, the Internet 140, an IP Multimedia Subsystem (IMS) 150, and a network services backbone 160. The cellular core network 130 manages the traffic that flows between the cellular network and the Internet 140. The IMS 150 may be generally described as an architecture for delivering multimedia services to the UEs 110 and 112 using the IP protocol. The IMS 150 may communicate with the cellular core network 130 and the Internet 140 to provide the multimedia services to the UEs 110 and 112. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks. In some example embodiments, the network services backbone 160 may implement the SM-DP+ and enablement server(s) described below. However, it is not a requirement that the SM-DP+ and enablement server(s) reside in the network services backbone 160. The SM-DP+ and enablement server (s) may be resident anywhere within the network arrangement 100.

Figure 2:
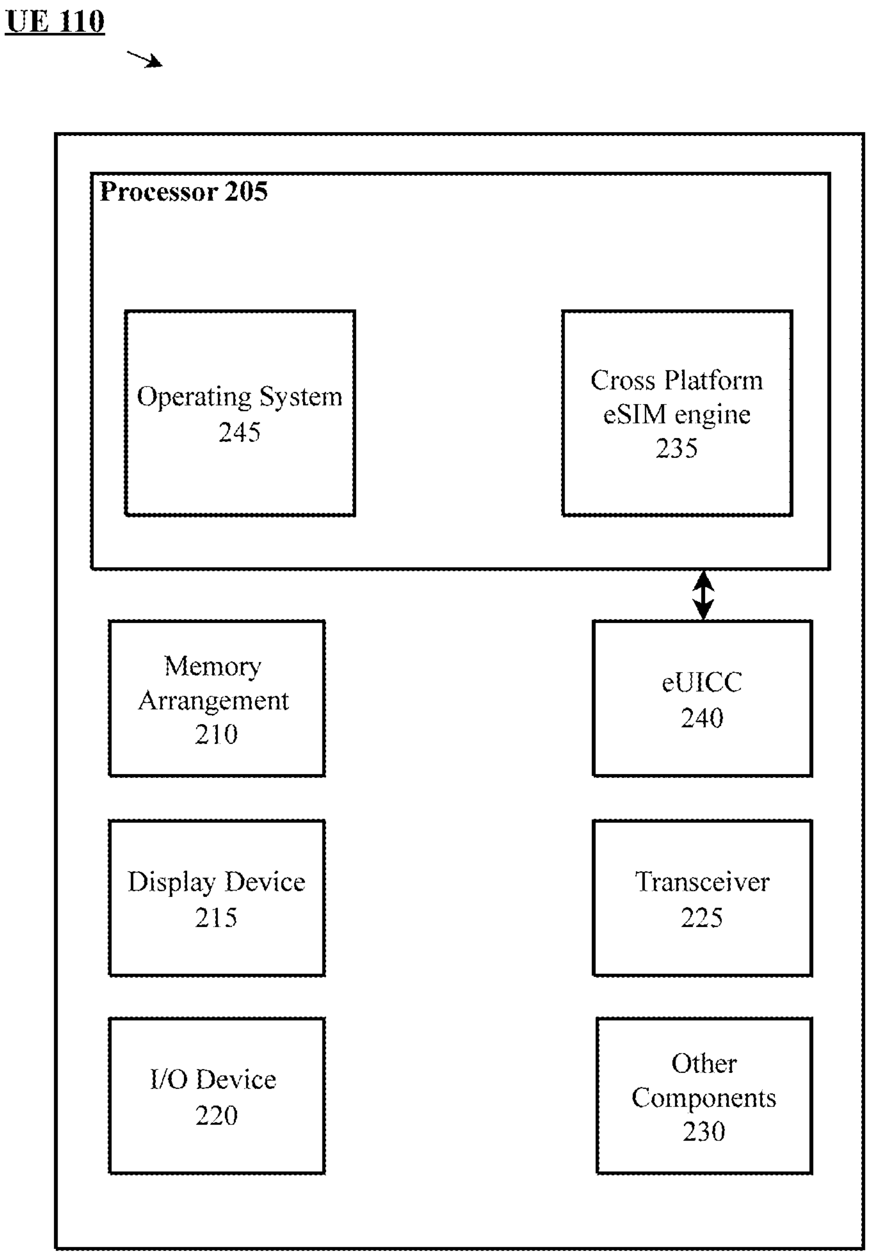
FIG. 2 shows an example UE according to various example embodiments.

FIG. 2 shows an example UE 110 according to various example embodiments. The UE 110 will be described with regard to the network arrangement 100 of FIG. 1. The UE 110 may represent any electronic device including the UE

112 and may operate as either a source or target for eSIM profile transfers. The UE 110 may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device (such as a camera), ports to electrically connect the UE 110 to other electronic devices, sensors to detect conditions of the UE 110, etc. An embedded Universal Integrated Circuit Card (eUICC) 240 may be a hardware component embedded into the UE 110 configured to store a number of carrier profiles, e.g., eSIM profiles.

The processor 205 may be configured to execute an operating system 245 for the UE 110. The operating system may be software that manages the basic functions of the UE 110, including task scheduling, application execution, and peripheral control. The operating system 245 may manage the interface between the hardware and software of the UE 110 and may provide a user interface to a user.

The processor 205 may be configured to execute a plurality of engines for the UE 110. For example, the engines may include a cross platform eSIM engine 235 for performing operations related to UE handling of inter-platform eSIM profile transfers. The cross platform eSIM engine 235 may perform various operations when the UE 110 is operating as either a target or a source in an eSIM profile transfer process. The operations include, but are not limited to, token transfer and associated bindings, signaling platform types, nonce generation, 3PA application protocol interface (API) handling, secure connection generation, and QR code generation. Each of these operations will be described in greater detail below.

The above referenced engine being an application (e.g., a program) executed by the processor 205 is only an example. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The example embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen.

The transceiver 225 may be a hardware component configured to establish a connection with the 5G-NR RAN 120. Accordingly, the transceiver 225 may operate on a variety of different frequencies or channels (e.g., set of consecutive frequencies). The transceiver 225 includes circuitry configured to transmit and/or receive signals (e.g., control signals, data signals). Such signals may be encoded with information implementing any one of the methods described herein. The processor 205 may be operably coupled to the transceiver 225 and configured to receive from and/or transmit signals to the transceiver 225. The processor 205 may be configured to encode and/or decode signals (e.g., signaling from a base station of a network) for implementing any one of the methods described herein.

Figure 3:
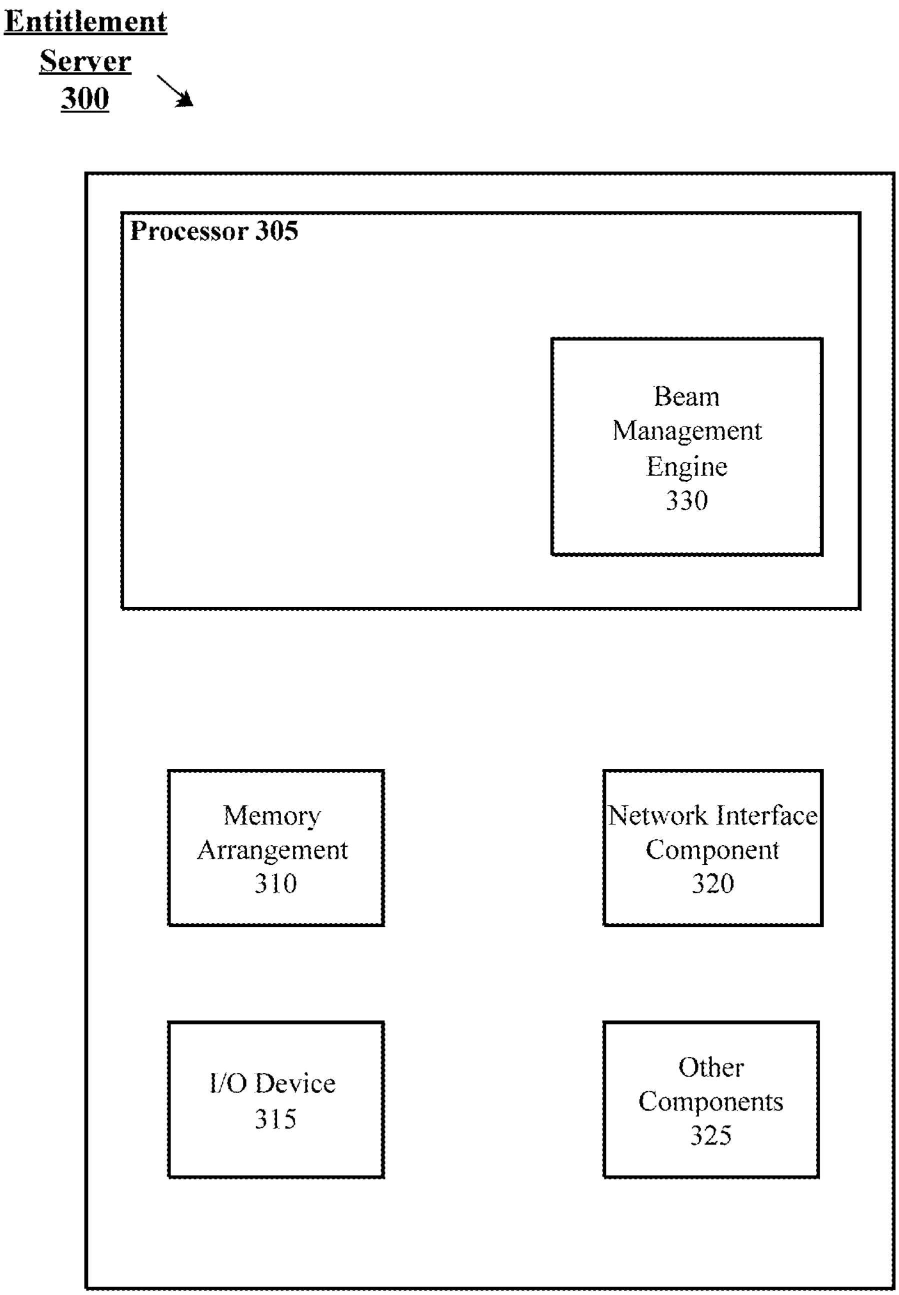
FIG. 3 shows an example base station, according to various example embodiments.

FIG. 3 shows an example entitlement server 300 according to various example embodiments. The entitlement server 300 may represent a network element implemented by a carrier or a third party (e.g., a manufacturer of the UE) that performs various operations related to eSIM profile transfers such as over-the-air configuration of UE eSIM profiles. In some examples, the entitlement server 300 may be implemented in a server device such as illustrated in the example of FIG. 3. In other examples, the entitlement server 300 may be implemented in a distributed manner such as in a cloud computing implementation or as a network function.

The entitlement server 300 may include a processor 305, a memory arrangement 310, an input/output (I/O) device 315, a network interface component (NIC) 320, and other components 325. The other components 325 may include, for example, an audio input device, an audio output device, a battery, a data acquisition device, ports to electrically connect the entitlement server 300 to other electronic devices and/or power sources, etc.

The processor 305 may be configured to execute a plurality of engines for the entitlement server 300. For example, the engines may include a cross platform eSIM engine 330 for performing operations related to transferring eSIM profiles from a source running on a first platform (e.g., first type of OS) to a target running on a second platform (e.g., second type of OS). Examples of these operations will be provided in greater detail below.

The memory 310 may be a hardware component configured to store data related to operations performed by the SM-DP+ 300. The I/O device 315 may be a hardware component or ports that enable a user to interact with the SM-DP+ 300.

The NIC 320 may be a hardware component configured to exchange data with the UE 110, any other UE or any other component in the network arrangement 100 either directly or indirectly. Because the SM-DP+ 300 is typically resident within the network, the NIC 320 may include a wired network interface such as an Ethernet or other wired type network interface. In some examples, the NIC 320 may also include a wireless interface and operate on a variety of different frequencies or channels (e.g., set of consecutive frequencies). Therefore, the NIC 320 may include one or more components (e.g., radios) to enable the data exchange with the various networks and UEs. The NIC 320 includes circuitry configured to transmit and/or receive signals (e.g., control signals, data signals). Such signals may be encoded with information implementing any one of the methods described herein. The processor 305 may be operably coupled to the NIC 320 and configured to receive from and/or transmit signals to the NIC 320. The processor 305 may be configured to encode and/or decode signals (e.g., signaling from a UE) for implementing any one of the methods described herein.

Figure 4:
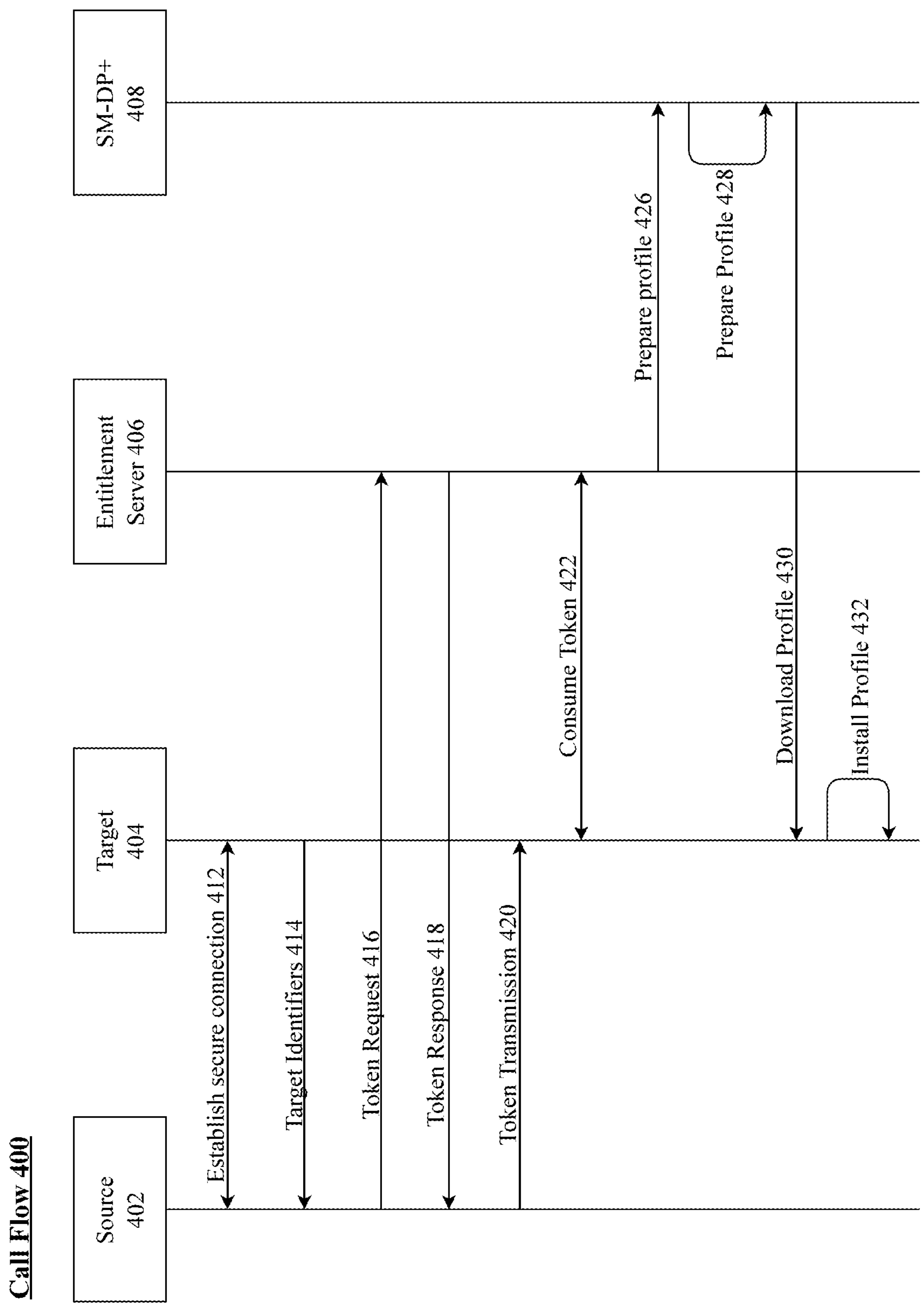
FIG. 4 shows an example call flow for transferring an eSIM profile according to various example embodiments.

FIG. 4 shows an example call flow 400 for transferring an eSIM profile according to various example embodiments. The call flow 400 is described as a high-level overview of several aspects of the example embodiments. Further details will be provided with respect to the further call flows described below. The call flow 400 includes a source 402 and a target 404. In the call flow 400, the source 402 may include a TS.43 protocol stack and the target 404 may include an MSP stack for eSIM profile transfer. The UE 110 may be the source and the UE 112 may be the target. However, this designation is arbitrary, and both the UE 110 and the UE 112 may be either the source or the target. The source and target may also feature different operating systems. The source and target both include an eUICC (e.g., substantially similar to the eUICC 240). If the protocol stack of the source or target is relevant to a particular example embodiment or call flow, it will be appropriately noted. The call flow 400 also includes an entitlement server 406 and an SM-DP+ 408, both of which were described above.

In 412, the source 402 and the target 404 establish a secure connection (e.g., via a secure tunnel) for eSIM profile transfer. In 414, the target 404 transmits target identifiers to the source 402. Additional examples of various types of target identifiers are provided below. In 416, the source 402 transmits a token request to the entitlement server 406. The request 416 also may indicate a platform type using signed blobs. Examples of different types of blobs will be described in greater detail below. In 418, the entitlement server 406 sends a token response, including a transfer token, to the source 402. In 420, the source 402 transmits the transfer token to the target 404.

In 422, the target 404 consumes the transfer token using the MSP and informs the entitlement server 406 that the transfer token has been consumed. The consuming of the transfer token may comprise any operation(s) performed by and/or messages exchanged between the entitlement server 406 and the target 404 to validate the target 404 has a valid transfer token and is entitled to receive the eSIM profile.

In 426, the entitlement server 406 transmits a prepare profile message to the SM-DP+ 408. In 428, the SM-DP+ 408 prepares an eSIM profile. In 430, the SM-DP+ transmits the eSIM profile to the target 404. In 432, the target 404 installs the eSIM profile.

Figure 5:
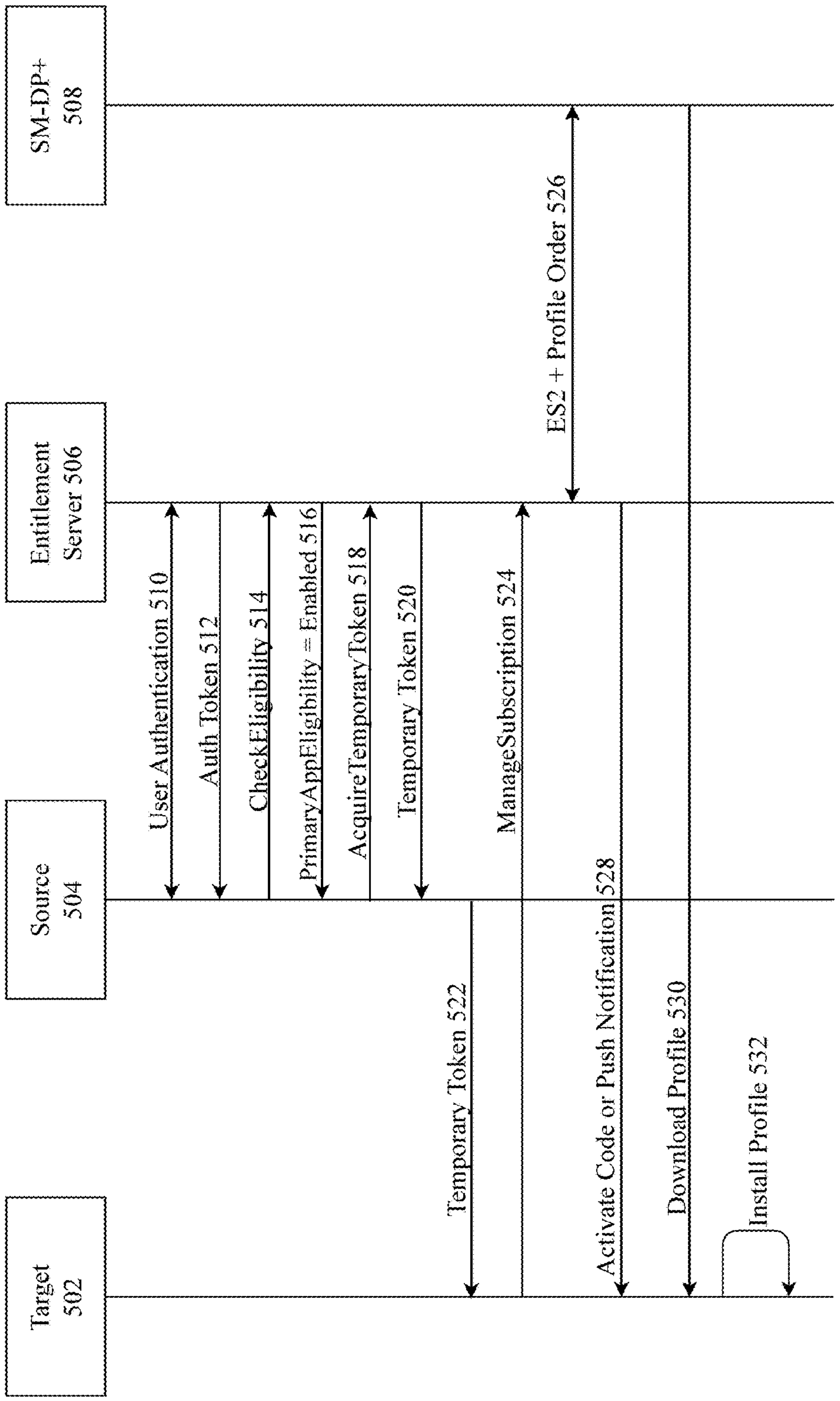
FIG. 5 shows an example call flow for transferring an eSIM profile using GSMA process according to various example embodiments.

FIG. 5 shows an example call flow 500 for transferring an eSIM profile using GSMA process according to various example embodiments. The source 504, target 502, and SM-DP+ 508 are substantially similar to the equivalent entities described with reference to FIG. 4. The entitlement server 506 may also include a Mobile Network Operator (MNO) backend capable of management of the MNO network infrastructure and subscriber management.

In 510, the source 504 performs user authentication procedures with the entitlement server 506 via an Extensible Authentication Protocol-Authentication and Key Agreement (EAP-AKA). In 512, the entitlement server 506 transmits an authentication token to the source 504. In 514, the source 506 transmits a check eligibility message to the entitlement server 506, including the International Mobile Equipment Identifier (IMEI) of the source 504 and the authentication token received in 512.

In 516, the entitlement server 506 transmits a PrimaryAppEligibility-Enabled message to the source 504. In 518, the source 504 transmits an acquire temporary token message to the entitlement server 506, including the authentication token. In 520, the entitlement server 506 transmits a temporary token to the source 504, including an expiration time for the temporary token.

In 522, the source 504 transmits the temporary token to the target 502, including other relevant information related to the eSIM profile transfer.

In 524, the target 502 transmits a manage subscription (transfer) message to the entitlement server 506, including the temporary token and the old Integrated Circuit Card Identification Number (ICCID), e.g., the ICCID of the eUICC of the source 504.

In 526, the entitlement server 506 and the SM-DP+ 508 perform an ES2+ profile order operation. The ES2+ profile order operation is a known operation used to order eSIM profiles for specific eUICCs and will not be described further herein.

In 528, the entitlement server 506 transmits an activation code or a push notification to the target 502 to use to activate the eSIM profile when it is received from the SM-DP+ 508. In 530, the SM-DP+ 508 transmits the eSIM profile to the target 502. In 532, the target 502 installs and activates the eSIM profile.

Figure 6:
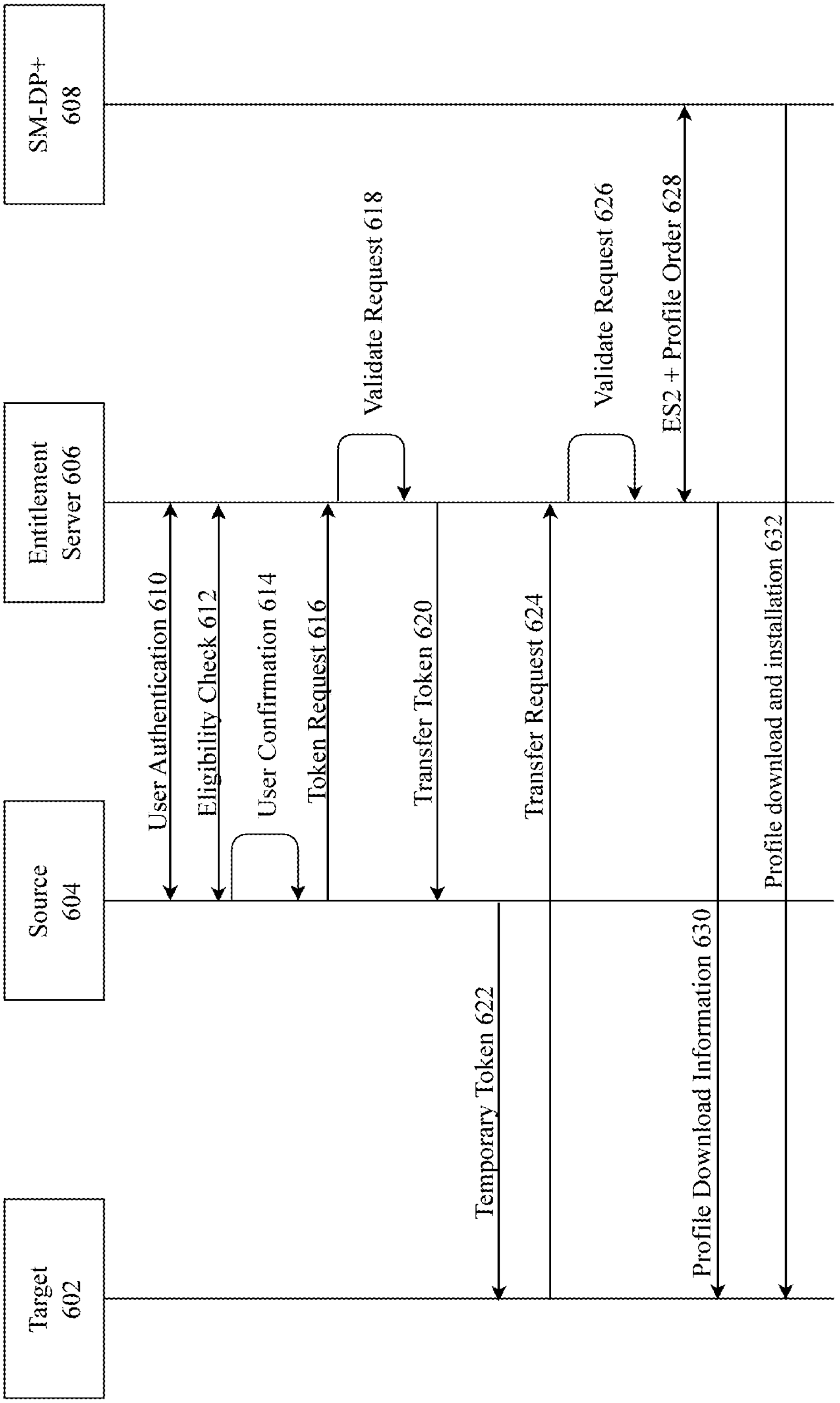
FIG. 6 shows an example call flow for transferring an eSIM profile using an example MSP process according to various example embodiments.

FIG. 6 shows an example call flow 600 for transferring an eSIM profile using an example MSP process according to various example embodiments. The MSP process is only one example of a MSP process and different manufacturers may have different MSP processes. The target 602, source 604, entitlement server 606, and SM-DP+ 608 are substantially similar to the equivalent entities described with reference to FIG. 5.

In 610, the source 604 performs user authentication procedures with the entitlement server 606 via EAP-AKA. In 612, the source 604 and the entitlement server 606 perform an eligibility check for the eSIM profile transfer.

In 614, the source 604 has a user confirm the eSIM profile transfer via a user interface. In 616, the source 604 transmits a token request to the entitlement server 606, including an indication that the user confirmed the eSIM profile transfer.

In 618, the entitlement server 606 validates the token request 616. In 620, the entitlement server 606 transmits a transfer token to the source 604, including an expiration time of the transfer token.

In 622, the source 604 transmits the transfer token to the target 602, including other relevant information for the eSIM transfer. In some example embodiments, following 622, the user may further verify the eSIM profile transfer by confirming on the target 602 via the user interface.

In 624, the target 602 transmits a transfer request 624 to the entitlement server 606, including the transfer token. In 626, the entitlement server 606 validates the request 624.

In 628, the entitlement server 606 and the SM-DP+ 608 perform an ES2+ profile order operation. In 630, the entitlement server 606 transmits eSIM download information to the target 602. In 632, the target 602 and the SM-DP+ 608 perform profile download and installation operations.

The following example embodiments describe a dual-stack entitlement server, e.g., a TS.43 stack and an MSP stack. A dual stack entitlement server may perform the operations for both TS.43 and MSP eSIM transfer operations, e.g., the operations performed by the entitlement server 506 (TS.43 stack) and entitlement server 606 (MSP stack). The following example call flows of FIGS. 7A-B describe eSIM profile transfers using a dual-stack entitlement server. In the following call flows, the operations of the SM-DP+ are not included as the call flows show the interaction between the dual-stack entitlement server and the source and target. However, during an eSIM profile transfer operation, the dual-stack entitlement server and the SM-DP+ may still perform the ES2+ profile order operations described above at the appropriate time.

Figure 7A:
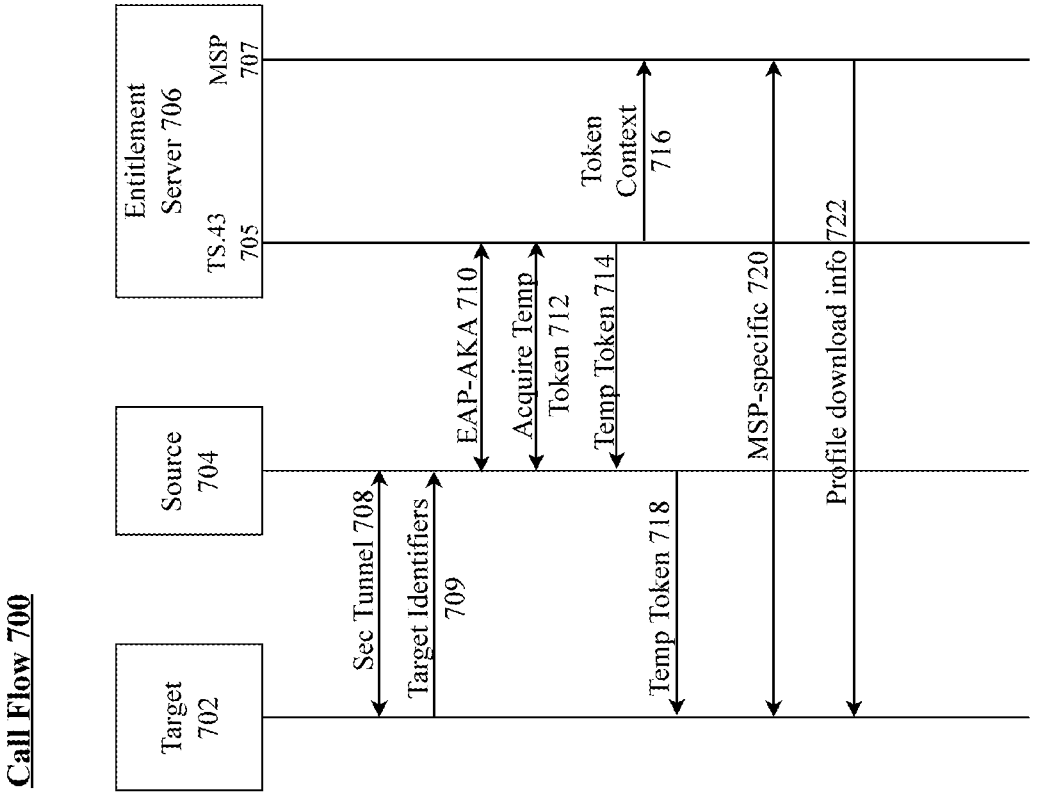
FIG. 7A shows a first example call flow for eSIM transfer using a dual-stack entitlement server according to various example embodiments.

FIG. 7A shows a first example call flow 700 for eSIM transfer using a dual-stack entitlement server according to various example embodiments. The call flow 700 shows a source 704 implementing a TS.43 stack transferring an eSIM profile to a target 702 implementing an MSP stack. The entitlement server 706 may feature both a TS.43 stack 705 and an MSP stack 707.

In 708, the target 702 and the source 704 establish a secure connection (e.g., via a secure tunnel) for eSIM profile transfer. In 709, the target 702 transmits target identifiers to the source 704, e.g., any information that may be used to identify the target 702 during the eSIM profile transfer operations.

In 710, the source 704 and the entitlement server 706 (via the TS.43 stack 705) perform authentication procedures via EAP-AKA. In 712, the source 704 and the TS.43 stack 705 of the entitlement server 706 perform an acquire temporary token procedure.

In 714, the TS.43 stack 705 of the entitlement server 706 transmits a temporary token to the source 704. In 716, the TS.43 stack 705 of the entitlement server 706 transmits token context information to the MSP stack 707 of the entitlement server 706, e.g., the operation 716 is an internal operation of the entitlement server 706.

In 718, the source 704 sends the temporary token to the target 702. As described above, the temporary token is a construct of the TS.43 stack transfer operations but the target 702 is executing an MSP stack. Thus, the operation 718 may also include the source 706 sending additional information related to the MSP stack so the target 702 may use the temporary token.

In 720, the target 702 and the MSP stack 707 of the entitlement server 706 perform MSP-specific transfer operations, including sending the temporary token in a transfer token field. As described above with reference to operation 624 of FIG. 6, the MSP stack may implement a transfer token for eSIM profile transfer. In this example, the target 702 sends the temporary token (e.g., the construct of the TS.43 eSIM profile transfer) received from the source 704 in the transfer token field rather than a temporary token. The dual-stack entitlement server 706 will understand that the temporary token in the transfer token field is equivalent to the transfer token of the MSP eSIM transfer operations and use this for the eSIM transfer operations.

In 722, the MSP stack 707 of the entitlement server 706 transmits eSIM profile download information to the target 702 similar to the operation 630 described above.

Figure 7B:
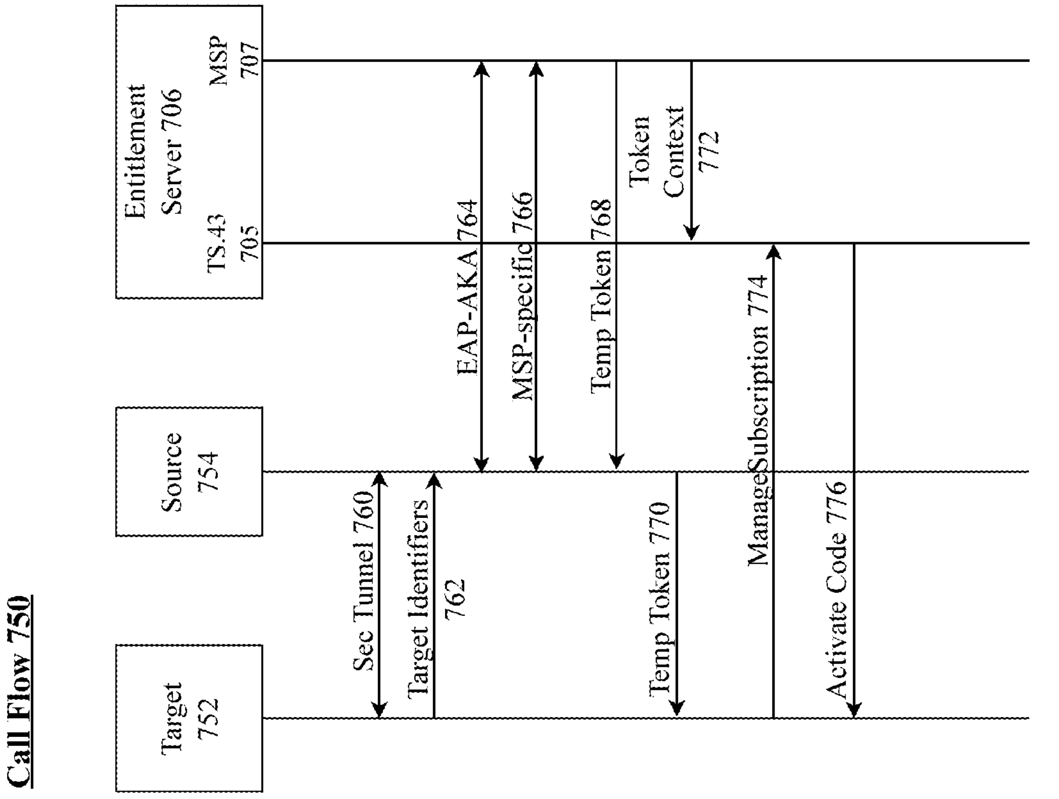
FIG. 7B shows a second example call flow for eSIM transfer using a dual-stack entitlement server according to various example embodiments.

FIG. 7B shows a second example call flow 750 for eSIM transfer using a dual-stack entitlement server according to various example embodiments. The call flow 750 shows a source 754 implementing an MSP stack transferring an eSIM profile to a target 752 implementing a TS.43 stack. The entitlement server 706 may feature both a TS.43 stack 705 and an MSP stack 707 and may be the same entitlement server 706 from the call flow 700.

In 760, the target 752 and the source 754 establish a secure connection via a secure tunnel for eSIM profile transfer. In 762, the target 752 transmits target identifiers to the source 754, e.g., any information that may be used to identify the target 752 during the eSIM profile transfer operations.

In 764, the source 754 and the MSP stack 707 of the entitlement server 706 perform authentication procedures via EAP-AKA. In 766, the source 754 and the MSP stack 707 of the entitlement server 706 perform MSP-specific transfer operations. In 768, the MSP stack 707 of the entitlement server 706 transmits a transfer token to the source 754.

In 772, the MSP stack 707 of the entitlement server 706 transmits token context information to the TS.43 stack 705 of the entitlement server 706, e.g., the operation 772 is an internal operation of the entitlement server 706.

In 770, the source 754 transmits the transfer token to the target 752. As described above, the transfer token is a construct of the MSP stack transfer operations but the target 752 is executing a TS.43 stack. Thus, the operation 770 may also include the source 754 sending additional information related to the TS.43 stack so the target 752 may use the transfer token.

In 774, the target 752 transmits a manage subscription (transfer) message to the TS.43 stack 705 of the entitlement server 706, including the transfer token in a temporary token field and the old ICCID, e.g., the ICCID of the eUICC of the source 754. As described above with reference to operation 624 of FIG. 5, the TS.43 stack may implement a temporary token for eSIM profile transfer. In this example, the target 752 sends the transfer token (e.g., the construct of the MSP eSIM profile transfer) received from the source 754 in the temporary token field rather than a transfer token. The dual-stack entitlement server 706 will understand that the transfer token in the temporary token field is equivalent to the temporary token of the TS.43 eSIM transfer operations and use this for the eSIM transfer operations.

In 776, the TS.43 stack 705 of the entitlement server 706 transmits an activation code or a push notification to the target 752 to use to activate the eSIM profile when it is received from the SM-DP+, similar to the operation 528 described above with reference to FIG. 5.

As described above, some example embodiments use a blob during the eSIM profile transfer process. A blob may be considered a server nonce. Example manners of calculating the server nonces (e.g., blobs) will be described in greater detail below. The blobs may be used to provides protection against attacks, e.g., replay attacks.

Figure 8:
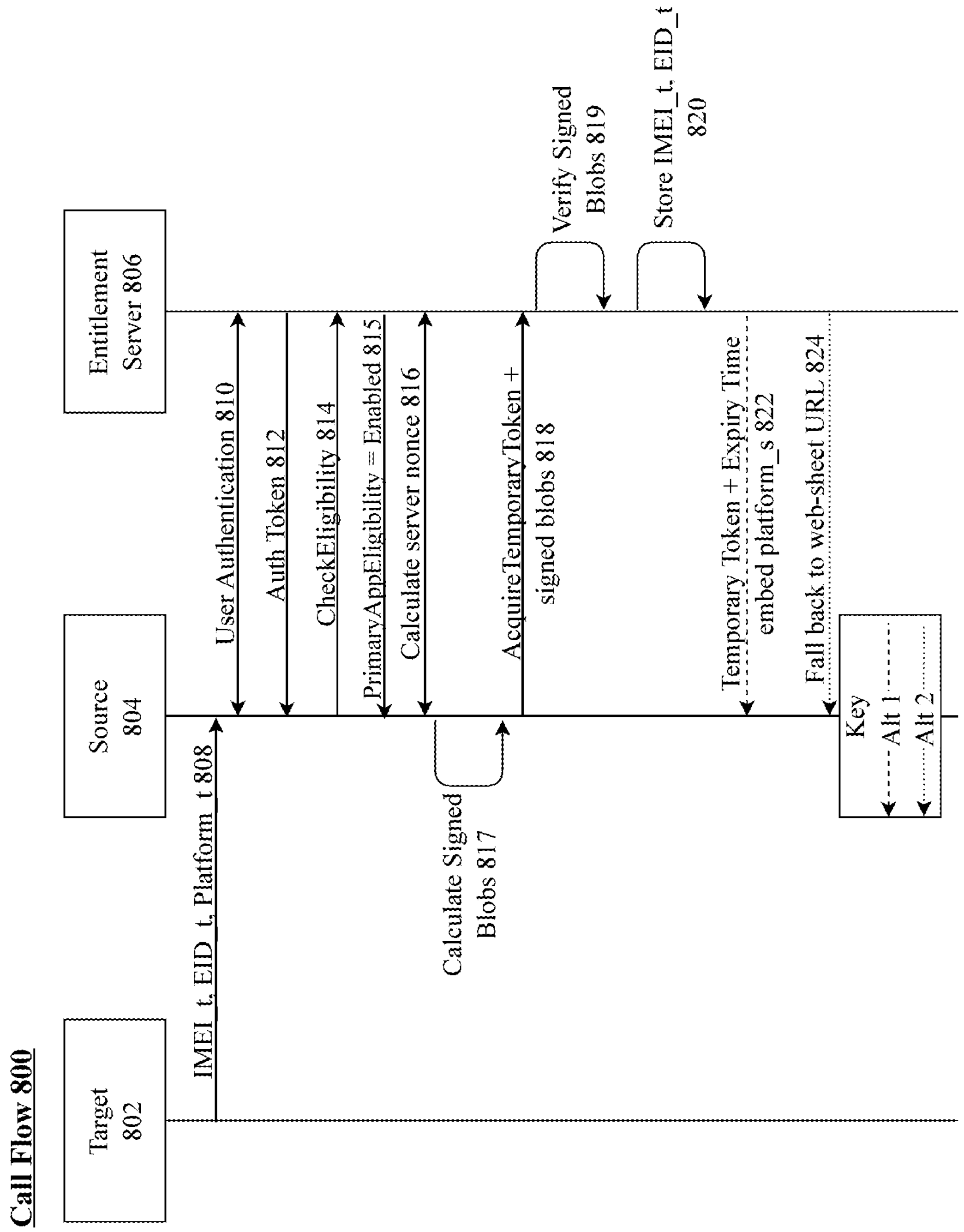
FIG. 8 shows an example call flow for an eSIM profile transfer process using signed blobs according to various example embodiments.

FIG. 8 shows an example call flow 800 for an eSIM profile transfer process using signed blobs according to various example embodiments. The target 802, the source 804 and entitlement server 806 feature substantially similar capabilities to similar entities discussed previously in the present disclosure, including the entitlement server including an MNO backend. In FIG. 8, it does not matter which protocol stack the target 802 or the source 804 utilize as the signed blob may be used with either the TS.43 stack or the MSP stack. In the example of FIG. 8, it may be considered that the source 804 implements a TS.43 stack and the target 802 implements an MSP stack for a cross-platform eSIM profile transfer from a GSMA OS to an MSP OS. The call flow 800 may be modified to be used for the opposite cross-platform eSIM profile transfer, e.g., from an MSP OS to a GSMA OS.

It is possible that a malicious actor may initiate a replay attack during an eSIM profile transfer. The call flow 800 utilizes a server nonce (e.g., blob) to provide protection against such attacks. Using additional source and target information informs the entitlement server 806 of a cross-platform transfer. With this information, the entitlement server may embed a source platform type in the temporary token as will be described in more detail below.

In 808, the target 802 transmits a message to the source 804 containing an International Mobile Equipment Identity (IMEI) of the target 802 (IMEI_t), an embedded identity document (EID) of the target 802 (EID_t), and a platform type of the target 802 (platform_t). The platform type may be the OS that is being executed by the target 802, e.g., GSMA OS, MSP OS, etc.

The operations 810-815 are similar to the corresponding operations 510-516 described with reference to FIG. 5 and will not be described again.

In 816, the source 804 and the entitlement server 806 perform a server nonce calculation. In some example embodiments, this calculation may be performed by hashing the authentication token since both the source 804 and the entitlement server 806 have this information at this point of the call flow 800. In other embodiments a new application programming interface (API) may be introduced that includes information common to the source 804 and the entitlement server 806 that may be used to calculate a server nonce. While this operation is described as the source 804 calculating the server nonce, in some example embodiments, the source 804 may retrieve the server nonce from the entitlement server 806 rather than calculating the server nonce, e.g., via the new API.

In 817, the source 817 calculates one or both of two types of signed blobs. The first type of signed blob includes the server nonce calculated in 816, the [IMEI_t, EID_t, platform_t] received in 808, the [IMEI_s, EID_s, and Platform_s] of the source 804, and a user intent level (e.g., biometric information, pass code, etc.). This first type of blob may be verified and signed by the operating system of the source 804 when the user authentication (e.g., biometric information, pass code, etc.) is successful.

The second type of blob includes the server nonce calculated in 816 and the ICCID of the eSIM profile, which may be verified and signed by the eUICC of the source 804 only if the ICCID is installed on the source 804.

In 818, the source 804 transmits an acquire temporary token message to the entitlement server 806 that may include the authentication token and one or more of the signed blobs.

In 819, the entitlement server 806 verifies the signed blobs by checking the platforms, EIDs, attestation blob (e.g., the first type of blob), and the user intent level (the second type of blob). In 820, the entitlement server 806 stores the IMEI_t and the EID_t.

The entitlement server 806 may be completely satisfied with the validation performed in 819. However, in some instances, the entitlement server 806 may have validated the information but may not be completely satisfied with the validation (e.g., enough of the information included in the signed blobs is verified to consider the request valid, but there is some incorrect information). Thus, after 820, there may be two different alternatives to handle these situations.

In a first alternative (e.g., when the entitlement server 806 is completely satisfied with the validation results), in 822, the entitlement server 806 transmits an encrypted temporary token including an expiration time of the temporary token including an identification of the source platform (e.g., embed_platform_s) to the source 804.

In a second alternative (e.g., when the entitlement server 806 is not completely satisfied with the validation results), in 824, the entitlement server 806 may request that the source 804 perform additional validation checks. For example, in 824, the entitlement server 806 may send the source 804 a URL of a separate authentication server. The source 804 may then perform a fallback operation via the web page associated with the URL to further verify the identity of the source 804. If the further authentication of the source 804 is successful, the entitlement server 806 may then send the encrypted temporary token including an expiration time of the temporary token including an identification of the source platform (e.g., embed_platform_s) to the source 804.

Figure 9:
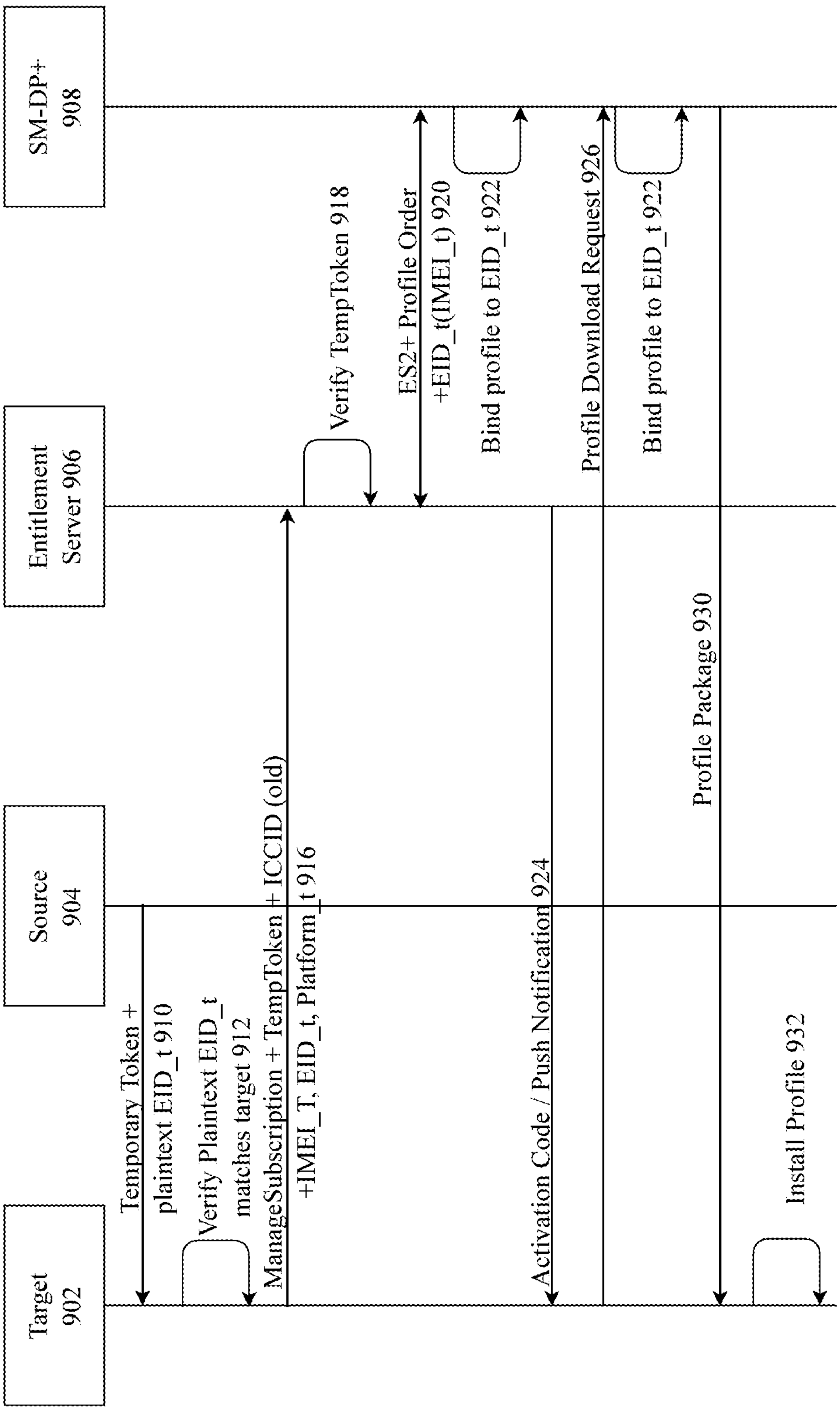
FIG. 9 shows an example call flow of an eSIM profile transfer process including binding a session token to a target device according to various example embodiments.

FIG. 9 shows an example call flow 900 of an eSIM profile transfer process including binding a session token to a target device according to various example embodiments. Binding the session token to an IMEI or EID may ensure that only the target 902 may download the prepared profile. The target 902, source 904, and entitlement server 904 are substantially similar to those discussed in FIG. 8. Again, in this example, the cross-platform eSIM profile transfer is from a GSMA OS to an MSP OS but the call flow 900 may be modified to be used for the opposite cross-platform eSIM profile transfer, e.g., from an MSP OS to a GSMA OS. In addition, the call flow 900 may begin after the source 904 receives the temporary token from the entitlement server 906, e.g., after operation 520 of FIG. 5 or operation 822 of FIG. 8.

In 910, the source 904 transmits a temporary token to the target 902, including an appended EID_t. In some examples, the EID_t may be provided in plaintext but that is not a requirement. For example, as described above with respect to operation 808 of FIG. 8, the target 902 may have sent its EID_t when initiating the eSIM profile transfer with the source 904. In 912, the target 902 verifies that the plaintext EID_t matches the target 904.

In 916, the target 902 transmits a manage subscription (transfer) message to the entitlement server 906, including the temporary token and the old Integrated Circuit Card Identification Number (ICCID), e.g., the ICCID of the eUICC of the source 904 similar to the operation 524 of FIG. 5. In this example embodiment, the manage subscription message may further include the IMEI_t, the EID_t, and the platform_t, each of which was described above.

In 918, the entitlement server 906 verifies the temporary token. As described above, during the call flow 800, the entitlement server 906 may have acquired the signed blobs from the source 904 that includes various information. The entitlement server 906 may then use this information (e.g., the platform/EID attestation blob, the user intent level) or other information to verify the temporary token.

In some example embodiments (not shown), following 918, the entitlement server 906 may request that the target 802 perform additional validation checks similar to those described above for operation 824 of FIG. 8. For example, the entitlement server 906 may send the target 902 a URL of a separate authentication server, which may then prompt the user for additional authentication on the target 902.

In 920, the entitlement server 906 and SM-DP+ 908 perform an ES2+ profile order process. In this example, during the ES2+ profile order process, the entitlement server 906 may provide the SM-DP+ 908 with the EID_t and IMEI_t. In 922, the SM-DP+ 908 binds the eSIM profile to the EID_t.

In 924, the entitlement server 908 transmits an activation code or push notification to the target 902, indicating that the profile is ready to download. In 926, the target 902 transmits a profile download request message to the SM-DP+ 908. In 928, the SM-DP+ verifies the EID_t included in the download request message.

When the verification of the EID_t is successful in 928, in 930, the SM-DP+ 908 transmits the eSIM profile package to the target 902. In 932, the target 902 installs the eSIM profile package.

In the above examples, the various call flows for the eSIM profile transfer were described from the point of view of the overall process, e.g., the various interactions between the source, target, entitlement server and SM-DP+. In the following examples, the methods and call flows for eSIM profile transfer are described from the point of view of the client side, e.g., the source and/or target.

Figure 10:
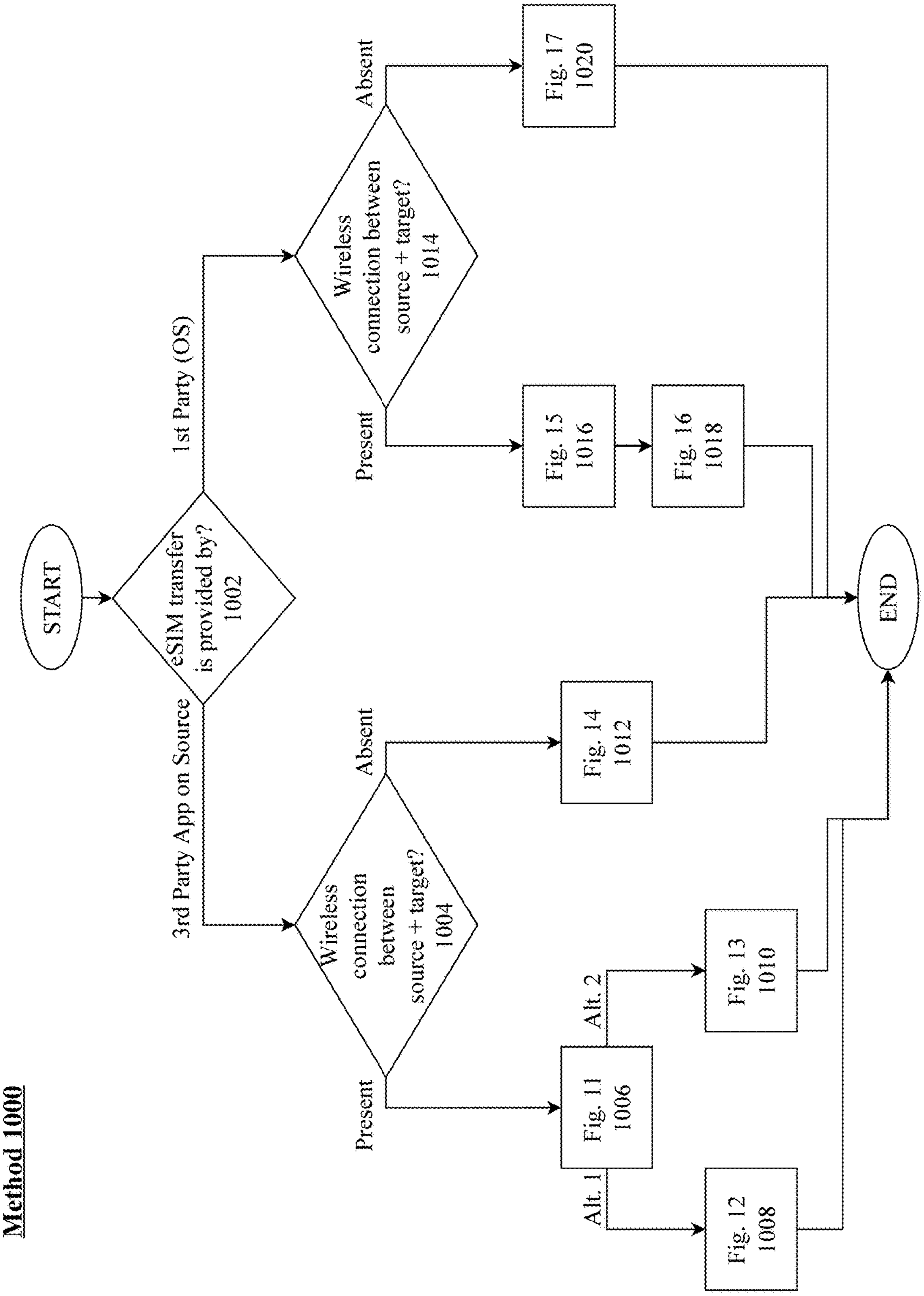
FIG. 10 shows an example method for client side operations for an eSIM profile transfer process according to various example embodiments.

FIG. 10 shows an example method 1000 for client side operations for an eSIM profile transfer process according to various example embodiments. The method 1000 is described with respect to FIGS. 11-17, which are all call flows. The method 1000 may generally describe the relationships between the various call flows and each of these call flows will be described in greater detail below.

In 1002, a source determines whether eSIM transfer operations are to be provided by a 3PA installed on the source or a first party (e.g., using the OS installed on the source). The method 1000 will be first described with respect to the 3PA path.

In 1004, the source determines whether there is a wireless connection (e.g., Wi-Fi, Bluetooth, NFC, ultra-wideband (UWB), etc.) between the source and a target. If there is a wireless connection (i.e., present), the source proceeds to the call flow of FIG. 11 in 1006. Following the call flow of FIG. 11 in 1006, the source may proceed to either the call flow of FIG. 12 in 1008, or the call flow of FIG. 13 in 1010 before proceeding to the end.

Figure 14:
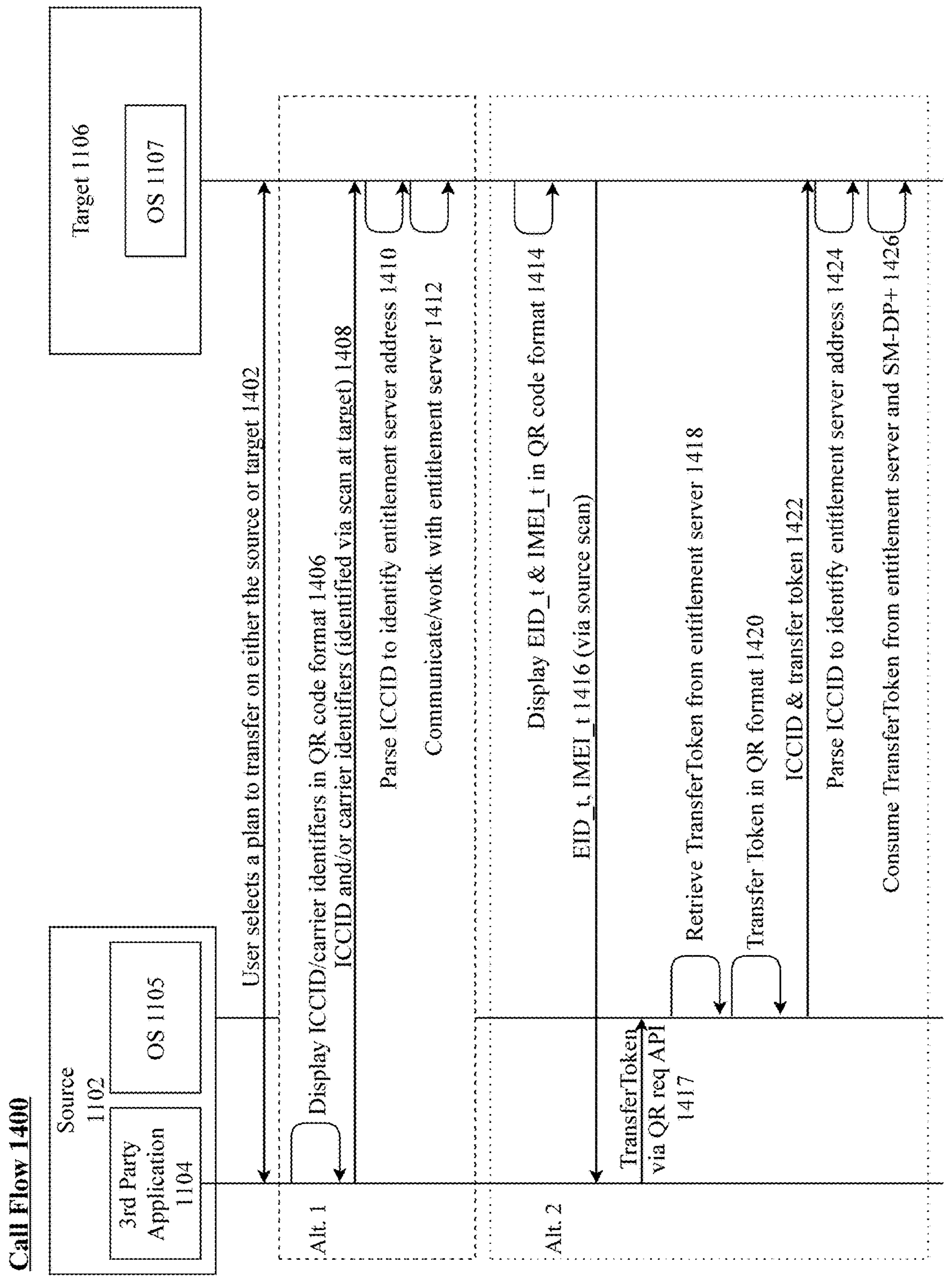
FIG. 14 shows an example call flow for an eSIM profile transfer when there is no communication connection between the source and the target according to various example embodiments.

If there is no wireless connection between the source and the target in 1004, the source proceeds to the call flow of FIG. 14 in 1012. Following the call flow shown in FIG. 14 in 1012, the source proceeds to the end.

Returning to 1002, if the source is using a first party (OS) level eSIM transfer operation method, the source proceeds to 1014. In 1014, the source determines whether there is a wireless connection between the source and the target (i.e., Wi-Fi, Bluetooth, NFC, etc.).

Figure 15:
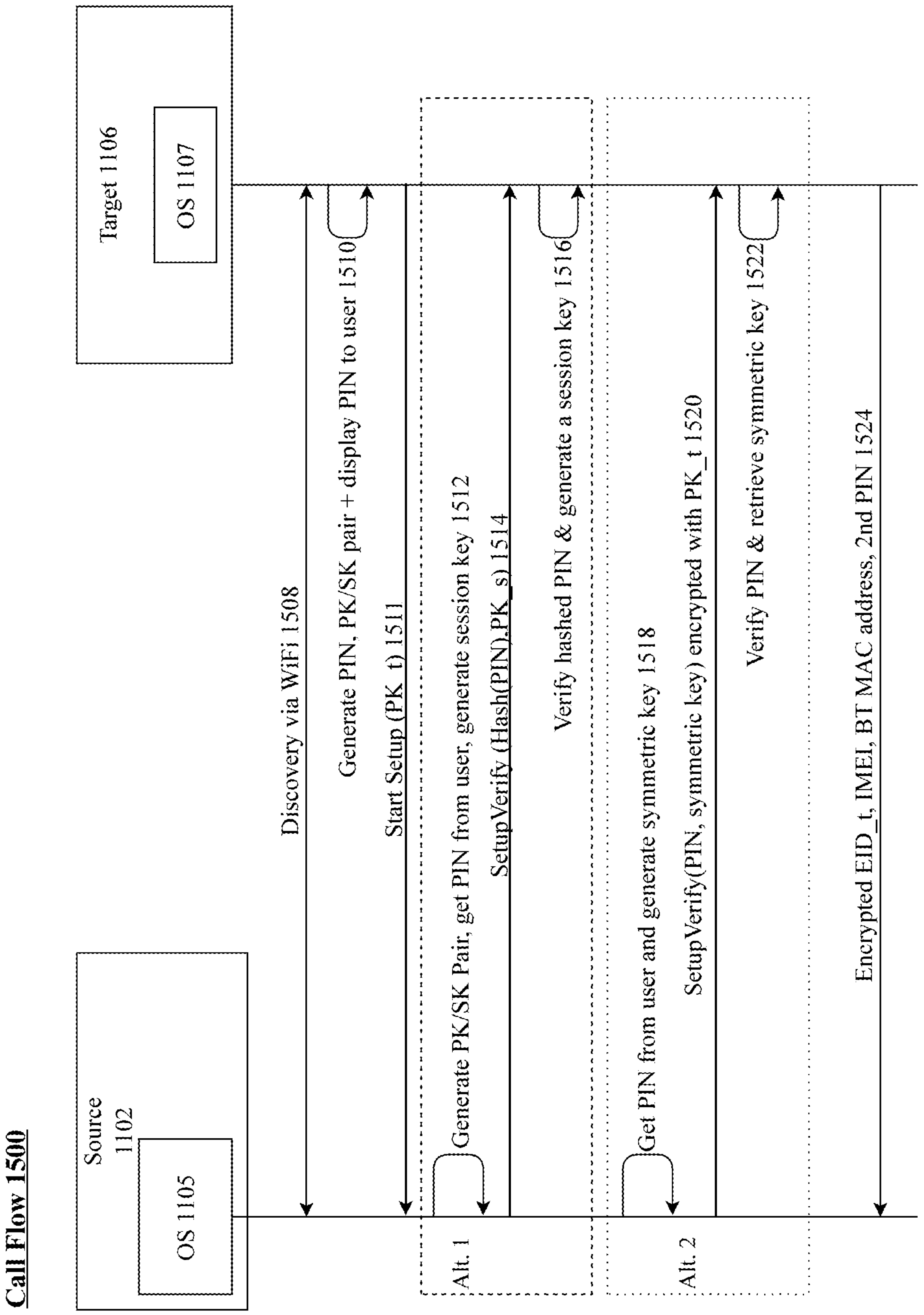
FIG. 15 shows an example call flow for an eSIM transfer process using an operating system (OS) of a source when the source and target have an active short-range communication connection according to various example embodiments.
Figure 16:
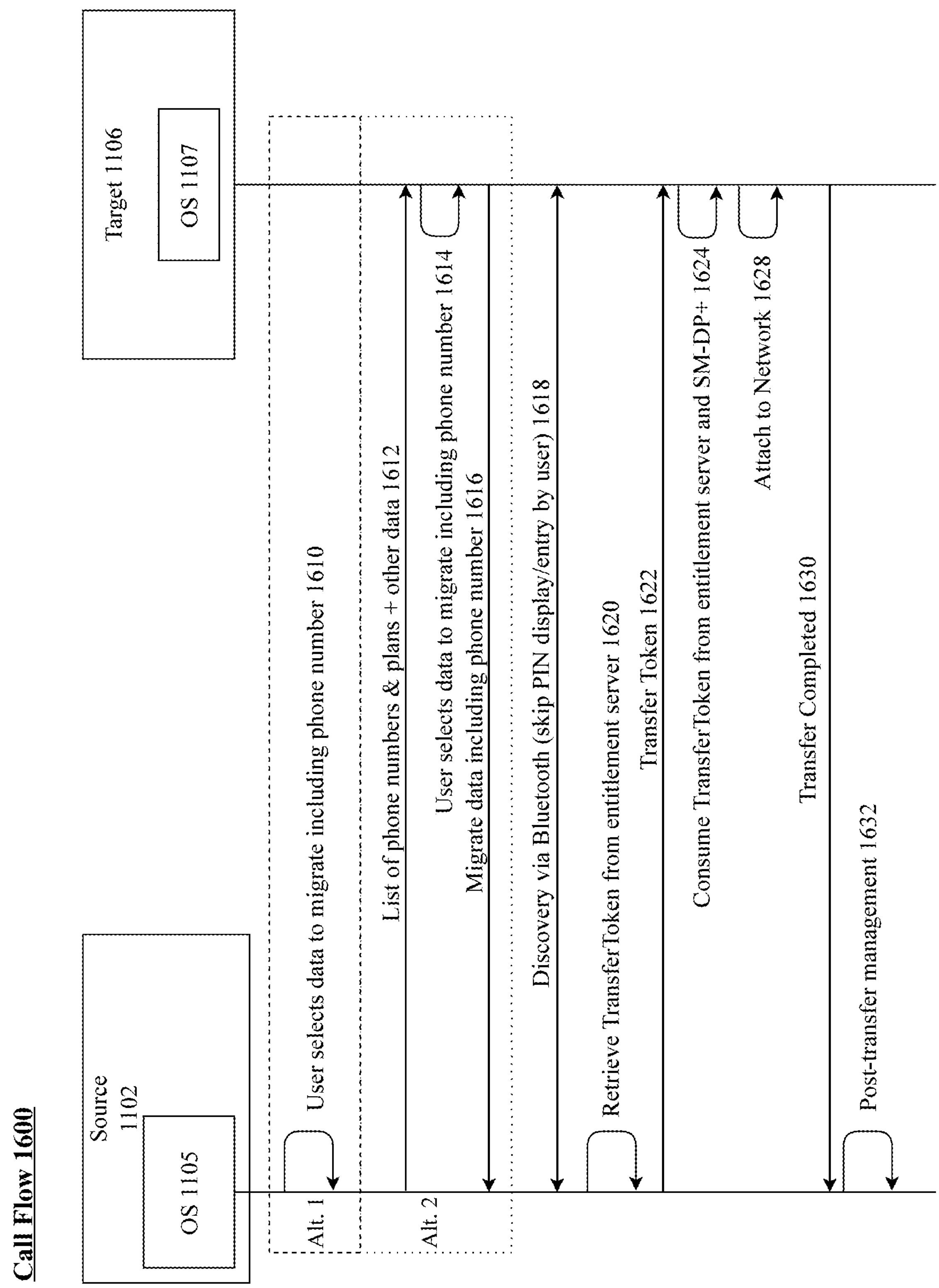
FIG. 16 shows an example call flow for an eSIM transfer process based on consuming transfer tokens using an OS of a source and target according to various example embodiments.

If there is a wireless connection between the source and the target, the source proceeds to the call flow of FIG. 15 in 1016, and then proceeds to the call flow of FIG. 16 in 1018 before proceeding to the end.

Figure 17:
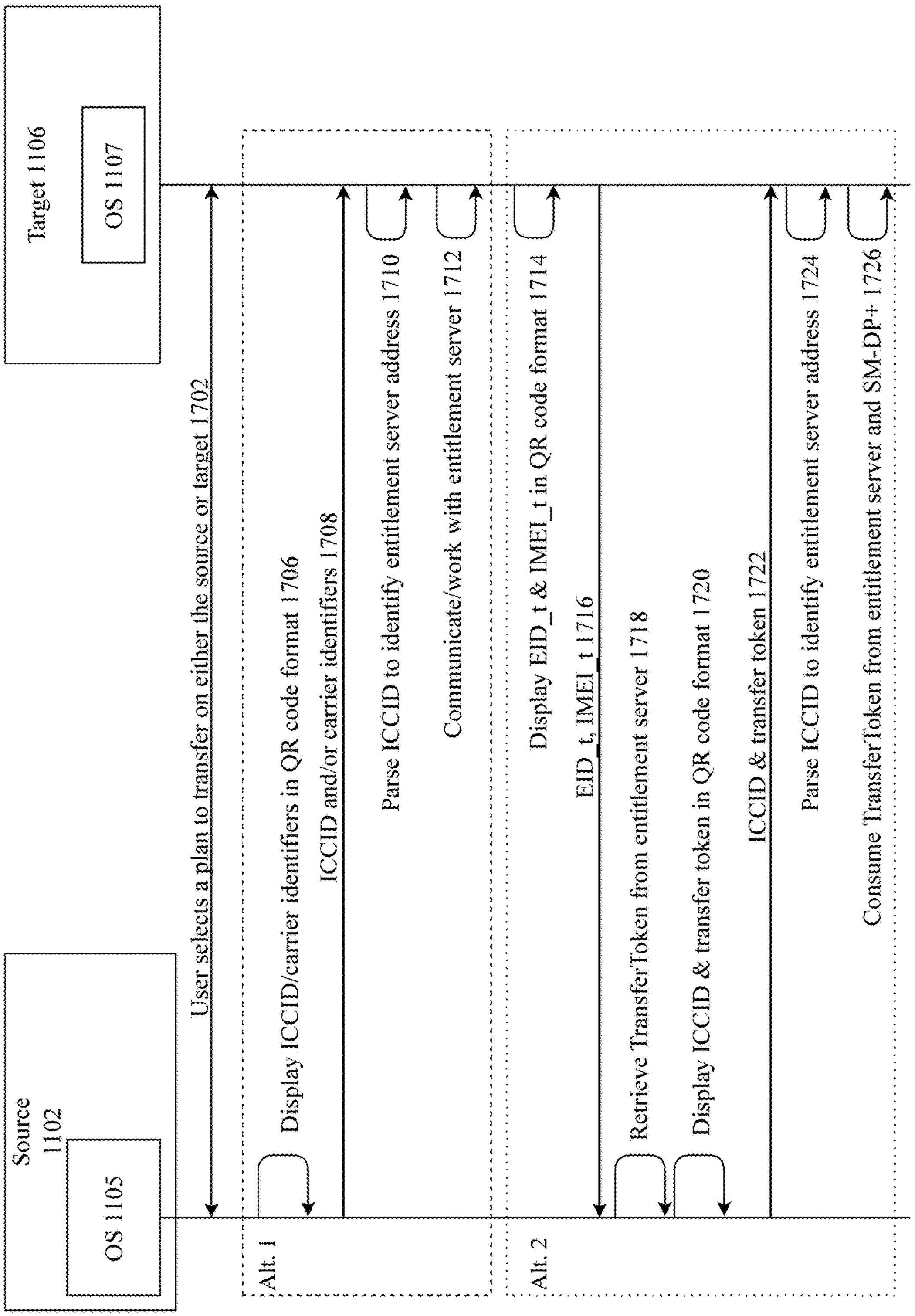
FIG. 17 shows an example call flow for an eSIM profile transfer using OSs of the source and target when there is no communication connection between the source and the target according to various example embodiments.

If there is no wireless connection between the source and the target in 1014, the source proceeds to the call flow of FIG. 17 in 1020.

Figure 11:
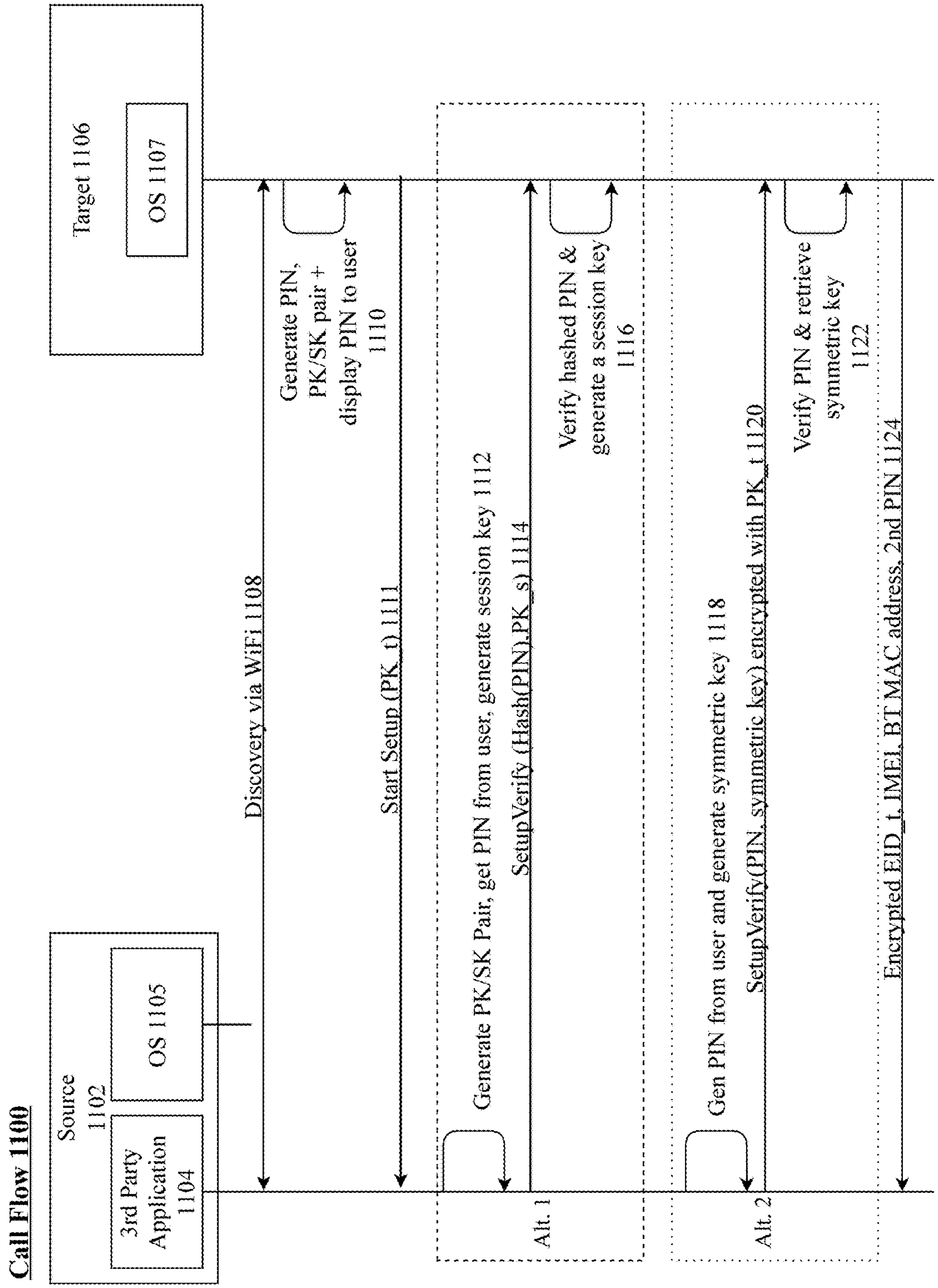
FIG. 11 shows an example call flow for an eSIM transfer process using a third party application (3PA) installed on a source when the source and target have an active communication connection according to various example embodiments.

FIG. 11 shows an example call flow 1100 for an eSIM transfer process using a third party application installed on a source when the source and target have an active short-range communication connection according to various example embodiments. The call flow 1100 shows a source 1102 including a 3PA 1104 and an OS 1105. For example, the 3PA 1104 may be a MNO application that a user may interact with to perform an eSIM profile transfer. The call flow 1100 also includes a target 1106 having an OS 1107.

The source 1102 having the 3PA 1104 and the OS 1105, and the target 1106 having the OS 1107 are shown in FIGS. 11-14. It should be appreciated that the call flows of FIGS. 11-14 correspond to the "third Party App on source" path shown in FIG. 10.

The call flow 1100 relates to the scenario where the source and target have an active communication connection, e.g., operation 1006 of the method 1000 of FIG. 10. In the context of this call flow, the term "active" includes that the target and the source are discoverable to each other, e.g., via NFC, a Bluetooth advertisement process, etc. The call flow 1100 shows operations and logic related to establishing a secure tunnel for eSIM profile transfers.

In 1108, the 3PA 1104 on the source 1102 and the OS 1107 of the target 1106 perform discovery operations via Wi-Fi (or any other means of the source 1102 and target 1106 discovering each other). This discovery operation may utilize a variety of different means such as proximity (e.g., NFC, Bluetooth, Ultra-Wideband), via a camera scanning operation performed using displayed codes or symbols containing information related to the eSIM profile transfer, etc. One of skill in the art will appreciate that the displayed camera code need not be a barcode or QR code, and that various designs may be used to convey eSIM transfer information.

The discovery operation may include the target or the source transmitting a beacon that may be used by the other device for identification purposes. Various types of device identifiers may be implemented for the purpose of the discovery operation. This may include a length field related to the length of a beacon; a tag field which is a beacon indicator; a version field indicating a protocol version; a device type (DevType) field including an enumerated (ENUM) ENUM (Smartphone, Tablet, Smartwatch, etc.); a platform field indicating a platform type ENUM (operating system name), and a role field including the role the device will perform during the eSIM transfer process, ENUM (source, target). One of skill in the art will appreciate that any combination of these identifiers may be utilized by a source or a target in a beacon.

In 1110 the OS 1107 of the target 1106 generates a random personal identification number (PIN), PK/SK pair (Public and Private key pair) and displays the PIN to the user so the user may enter the PIN at a later time into the source 1102. In 1111, the target OS 1107 transmits a SetupStart message to the source 3PA 1104, including the PK_t (e.g., the target Public Key). Following 1111, two alternative operation flows are described.

In a first alternative, the 3PA 1104 proceeds from 1111 to 1112. In 1112, the 3PA 1104 generates a PK/SK pair and receives the PIN from the user via a user input (UI) and generates a session key. In 1114, the 3PA 1104 transmits a SetupVerify message to the target OS 1107, including the hashed PIN and the PK s. In 1116, the target OS 1107 verifies the hashed PIN and generates a session key.

Turning now to the second alternative, in 1118, the 3PA 1104 receives the PIN from the user via the UI and generates a symmetric key. In 1120 the 3PA 1104 transmits a SetupVerify message to the target OS 1107, including the PIN and symmetric key. The PIN and symmetric key are encrypted with the PK_t. In 1122, the target OS 1107 verifies the PIN and retrieves the symmetric key.

Following either the first or second alternative, the call flow 1100 proceeds to 1124. In 1124, the target OS 1107 transmits encrypted information to the 3PA 1104 of the source 1102 that may be used to establish the secure tunnel. This encrypted information may include, for example, the EID_t, IMEI, Bluetooth MAC address, a second PIN generated by the target 1106, etc. Following the completion of the call flow 1100, a secure tunnel has been established between the source 1102 and the target 1106 for the eSIM profile transfer.

Figure 12:
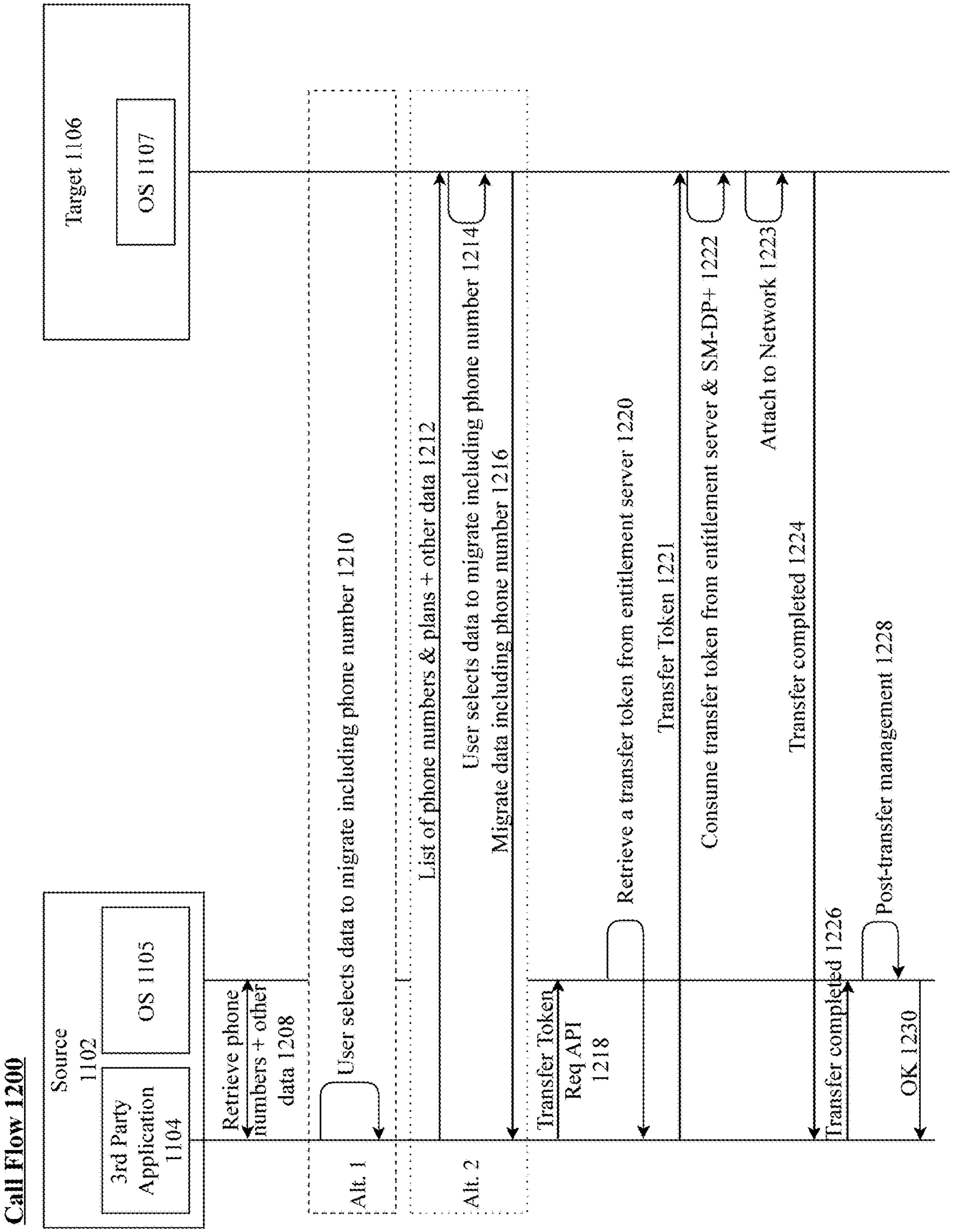
FIG. 12 shows an example call flow for an eSIM transfer process using entitlement APIs for a 3PA installed on a source according to various example embodiments.

FIG. 12 shows a first example call flow 1200 for an eSIM transfer process using entitlement APIs for the 3PA installed on a source according to various example embodiments. The call flow 1200 may be performed following the establishment of the secure tunnel in the call flow 1100, e.g., operation 1008 of the method 100 of FIG. 10.

In 1208, the 3PA 1104 retrieves associated phone numbers and plans from the source OS 1105. The retrieval 1102 may also include other information such as contacts from a contact list, associated contact photos, etc.

Two alternatives are presented in the call flow 1200 for handling the retrieved phone numbers, etc. In the first alternative, in 1210, the 3PA 1104 prompts the user to select data to migrate to the target 1106, including one or more phone numbers on a UI of the source 1102. In the second alternative, in 1212, the 3PA 1104 transmits a list of phone numbers and MNO plans, as well as other data such as contacts and contact photos to the target OS 1107. In 1214, the user may select the data to migrate on a UI of the target 1106, e.g., a subset of the displayed phone numbers and other data. In 1216, the target OS 1107 sends the selection to the 3PA 1104.

In 1218, the 3PA 1104 transmits a transfer token request API to the OS 1105 of the source 1102, including the ICCID, EID_T, and IMEI_T. In 1220, the source OS 1105 using the transfer token request API retrieves a transfer token from an associated entitlement server and provides the transfer token to the 3PA 1104. For example, see any of the operations 418, 520, 620, 714, 768, or 822 described above. In 1221, the 3PA 1104 transmits the transfer token to the target OS 1107.

In 1222, the target OS 1107 consumes the transfer token from the entitlement server and SM-DP+. For example, see any of the operations 422, 524, 624, 720, 774, or 916 described above. In 1223, the target 1106 then attaches to the MNO network.

In 1224, the target OS 1107 transmits a transfer completed message to the 3PA 1104. In 1226, the 3PA 1104 transmits the transfer completed message to the source OS 1105. In 1228, the source OS 1105 performs various post-transfer management operations such as marking or removing the transferred eSIM profile. In 1230, the source OS 1105 transmits an OK/ACK message to the 3PA 1104 indicating the operations related to the transfer of the eSIM profile are complete.

Figure 13:
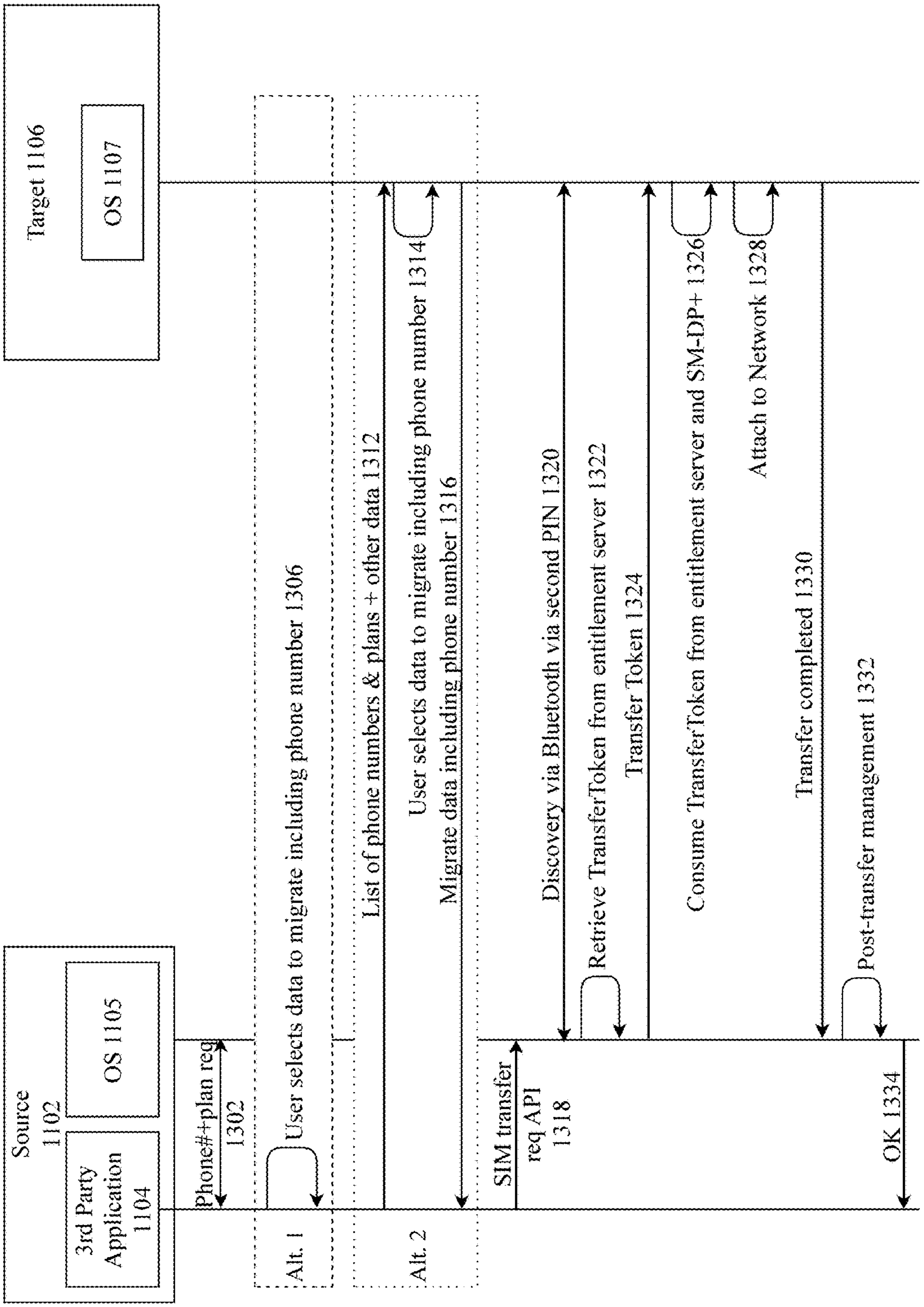
FIG. 13 shows a second example call flow for an eSIM transfer process using entitlement APIs for the 3PA installed on a source according to various example embodiments.

FIG. 13 shows a second example call flow 1300 for an eSIM transfer process using entitlement APIs for the 3PA installed on a source according to various example embodiments. The call flow 1300 may be performed following the establishment of the secure tunnel in the call flow 1100, e.g., operation 1010 of the method 1000 of FIG. 10. As shown in FIG. 10, the call flow 1300 may be an alternative to the call flow 1200. The call flow 1300 secures the transfer token and provides selective access to the token based on PIN entries and discovery procedures between the source 1102 and the target 1106.

The operations 1308-1316 are similar to the operations 1208-1216 described above with reference to the call flow 1200 and will not be described again.

In 1318, the 3PA 1104 transmits an eSIM transfer request API to the source OS 1105. The information that is transmitted may include, for example, the EID_t, IMEI, Bluetooth MAC address, a second PIN generated by the target 1106, etc., As described above, some or all of this information may have been received in an encrypted message from the target OS 1107 in, for example, operation 1124.

In 1320, the source OS 1105 and the target OS 1107 may perform a discovery operation using, for example, Bluetooth and the second PIN. The discovery operation may be performed using a different protocol and there is no requirement that the second PIN be used for the discovery operation.

In 1322, the source OS 1105 using the eSIM transfer request API retrieves a transfer token from an associated entitlement server. For example, see any of the operations 418, 520, 620, 714, 768, or 822 described above. In 1324, the source OS 1105 transmits the transfer token to the target OS 1107.

In 1326, the target OS 1107 consumes the transfer token from the entitlement server and SM-DP+. For example, see any of the operations 422, 524, 624, 720, 774, or 916 described above. In 1328, the target 1106 attaches to the MNO network.

In 1330, the target OS 1107 transmits a transfer completed message to the source OS 1105. In 1332, the source OS 1105 performs various post-transfer management operations such as marking or removing the transferred eSIM profile. In 1334, the source OS 1105 transmits an OK/ACK message to the 3PA 1104 indicating the operations related to the transfer of the eSIM profile are complete.

FIG. 14 shows an example call flow 1400 for an eSIM profile transfer when there is no communication connection between the source and the target according to various example embodiments. The call flow 1400 follows the 'absent' path shown following 1004 in FIG. 10 (i.e., there is no wireless connection between the source and the target). The call flow 1400 uses a QR code (or functionally equivalent) format displayed on the target or the source as a backup to substitute for the secure tunnel that is not available because there is no communication connection between the source and target.

In 1402, the user may select a plan to transfer on either the source 1102 or the target 1106. For the purposes of the call flow 1400, the user may select the source 1102 to act as the source device and the target 1106 to act as the target device, though this is only an example. Following 1402, two alternatives are presented depending on whether the source 1102 or target 1106 is used to display the QR code.

In a first alternative, the source 1102 displays the QR code (or functionally equivalent) format. In 1406, the 3PA 1104 of the source 1102 displays the ICCID and/or carrier identifiers in a QR code format on a display of the source 1102. In 1408, the target 1106 uses a camera or other optical scanning device to scans the QR code.

In 1410, the target OS 1107 parses the ICCID to identify an associated entitlement server address. In 1412, the target OS 1107 communicates with the entitlement server to retrieve eSIM transfer information. The user is prompted at 1412 to authenticate the transaction on the target 1106 (for example, via PIN/password/biometrics).

In a second alternative, the target 1106 displays the QR code (or functionally equivalent) format. Following 1402, in 1414, the target OS 1107 may display an EID_t and IMEI_t in a QR code format on a display of the target 1106. In 1416, the 3PA 1104 retrieves the EID_t and IMEI_t based on the source 1102 using a camera or other optical scanning device to scans the QR code displayed on the target 1106.

In 1417, the 3PA 1104 transmits a transfer token via QR request API to the source OS 1105, including the ICCID, EID_t, IMEI_t. In 1418, the source OS 1105, using the transfer token via QR request API including the ICCID, EID_t, IMEI_t, retrieves a transfer token from the associated entitlement server. For example, see any of the operations 418, 520, 620, 714, 768, or 822 described above.

In 1420, the source OS 1105, using a display of the source 1102, displays the ICCID and transfer token in a QR code format. In 1422, the ICCID and transfer token displayed via the QR code are scanned by the target 1106. In 1424, the target OS 1107 parses the scanned QR code ICCID to identify the associated entitlement server address.

In 1426, the target OS 1107 consumes the transfer token from the entitlement server and SM-DP+. For example, see any of the operations 422, 524, 624, 720, 774, or 916 described above.

FIGS. 15-17 show the first party path of the method 1000 of FIG. 10. The calls flows of FIGS. 15-17 show a source 1102 having an OS 1105 and a target 1106 having an OS 1107. Unlike the third party app on source path, there is no 3PA in these examples because the source OS 1105 is configured to perform all the operations of the source 1102 with respect to the eSIM profile transfer process.

FIG. 15 shows an example call flow 1500 for an eSIM transfer process using an operating system (OS) of a source when the source and target have an active communication connection according to various example embodiments. The call flow 1500 shows operations and logic related to establishing a secure tunnel for eSIM profile transfers.

The call flow 1500 relates to the scenario where the source and target have an active communication connection, e.g., operation 1016 of the method 1000 of FIG. 10. In the context of this call flow, the term "active" includes that the target and the source are discoverable to each other, e.g., via NFC, a Bluetooth advertisement process, etc.

In 1508, the OS 1105 of the source 1102 and the OS 1107 of the target 1106 perform discovery operations via Wi-Fi (or any other means of the source 1102 and target 1106 discovering each other). This discovery operation may utilize a variety of different means such as proximity (e.g., NFC, Bluetooth, Ultra-Wideband), via a camera scanning operation performed using displayed codes or symbols containing information related to the eSIM profile transfer, etc. One of skill in the art will appreciate that the displayed camera code need not be a barcode or QR code, and that various designs may be used to convey eSIM transfer information.

The discovery operation may include the target or the source transmitting a beacon that may be used by the other device for identification purposes. Various types of device identifiers may be implemented for the purpose of the discovery operation. This may include a length field related to the length of a beacon; a tag field which is a beacon indicator; a version field indicating a protocol version; a device type (DevType) field including an enumerated (ENUM) ENUM (Smartphone, Tablet, Smartwatch, etc.); a platform field indicating a platform type ENUM (operating system name), and a role field including the role the device will perform during the eSIM transfer process, ENUM (source, target). Any combination of these identifiers may be utilized by a source or a target in a beacon.

In 1510 the OS 1107 of the target 1106 generates a random personal identification number (PIN), PK/SK pair (Public and Private key pair) and displays the PIN to the user so the user may enter the PIN at a later time into the source 1102. In 1511, the target OS 1107 transmits a setup start message to the source OS 1105, including the PK_t (e.g., the target Public Key). Following 1511, two alternative operation flows are described.

In a first alternative, the source OS 1105 proceeds from 1511 to 1512. In 1512, the source OS 1105 generates a PK/SK pair and receives the PIN from the user via a user input (UI) and generates a session key. In 1514, the source OS 1105 transmits a setup verify message to the target OS 1107, including the hashed PIN and the PK s. In 1516, the target OS 1107 verifies the hashed PIN and generates a session key.

Turning now to the second alternative, in 1518, the source OS 1105 receives the PIN from the user via the UI and generates a symmetric key. In 1520 the source OS 1105 transmits a setup verify message to the target OS 1107, including the PIN and symmetric key. The PIN and symmetric key are encrypted with the PK_t. In 1522, the target OS 1107 verifies the PIN and retrieves the symmetric key.

Following either the first or second alternative, the call flow 1500 proceeds to 1524. In 1524, the target OS 1107 transmits encrypted information to the source OS 1105 that may be used to establish the secure tunnel. This encrypted information may include, for example, the EID_t, IMEI, Bluetooth MAC address, a second PIN generated by the target 1106, etc. Following the completion of the call flow 1500, a secure tunnel has been established between the source 1102 and the target 1106 for the eSIM profile transfer.

FIG. 16 shows an example call flow 1600 for an eSIM transfer process based on consuming transfer tokens using an OS of a source and target according to various example embodiments. The call flow 1600 may be performed following the establishment of the secure tunnel in the call flow 1500, e.g., operation 1018 of the method 1000 of FIG. 10.

Two alternatives are presented in the call flow 1600 for handling the migration of phone numbers from the source 1102 to the target 1106. In a first alternative, in 1610, the source OS 1105 receives input from a user via a UI of the source 1102 of associated phone numbers and plans that the user would like to migrate to the target 1106. The input may also identify other information such as contacts from a contact list, associated contact photos, etc.

In the second alternative, in 1612, the source OS 1105 transmits a list of phone numbers and MNO plans, as well as other data such as contacts and contact photos to the target OS 1107. In 1614, the user may select the data to migrate on a UI of the target 1106. In 1616, the target OS 1107 sends the selection to the source OS 1105.

In 1618, the source OS 1105 and the target OS 1107 may perform a discovery operation using, for example, Bluetooth MAC address and the second PIN, e.g., the information exchanged in operation 1524 of FIG. 15. The discovery operation may be performed using a different protocol and there is no requirement that the second PIN be used for the discovery operation.

In 1620, the source OS 1105 retrieves a transfer token from an associated entitlement server. For example, see any of the operations 418, 520, 620, 714, 768, or 822 described above. In 1622, the source OS 1105 transmits the transfer token to the target OS 1107.

In 1624, the target OS 1107 consumes the transfer token from the entitlement server and SM-DP+. For example, see any of the operations 422, 524, 624, 720, 774, or 916 described above. In 1628, the target 1106 attaches to the MNO network.

In 1630, the target OS 1107 transmits a transfer completed message to the source OS 1105. In 1632, the source OS 1105 performs various post-transfer management operations such as marking or removing the transferred eSIM profile.

FIG. 17 shows an example call flow 1700 for an eSIM profile transfer using OSs of the source and target when there is no communication connection between the source and the target according to various example embodiments. The call flow 1700 follows the 'absent' path shown following 1004 in FIG. 10 (i.e., there is no wireless connection between the source and the target). The call flow 1700 uses a QR code (or functionally equivalent) format displayed on the target or the source as a backup to substitute for the secure tunnel that is not available because there is no communication connection between the source and target.

In 1702, the user may select a plan to transfer on either the source 1102 or the target 1106. For the purposes of the call flow 1400, the user may select the source 1102 to act as the source device and the target 1106 to act as the target device, though this is only an example. Following 1702, two alternatives are presented depending on whether the source 1102 or target 1106 is used to display the QR code.

In a first alternative, the source 1102 displays the QR code (or functionally equivalent) format. In 1706, the OS 1105 of the source 1102 displays the ICCID and/or carrier identifiers in a QR code format on a display of the source 1102. In 1708, the target 1106 uses a camera or other optical scanning device to scans the QR code.

In 1710, the target OS 1107 parses the ICCID to identify an associated entitlement server address. In 1712, the target OS 1107 communicates with the entitlement server to retrieve eSIM transfer information. The user is prompted at 1712 to authenticate the transaction on the target 1106 (for example, via PIN/password/biometrics).

In a second alternative, the target 1106 displays the QR code (or functionally equivalent) format. Following 1702, in 1714, the target OS 1107 may display an EID_t and IMEI_t in a QR code format on a display of the target 1106. In 1716, the source OS 1105 retrieves the EID_t and IMEI_t based on the source 1102 using a camera or other optical scanning device to scans the QR code displayed on the target 1106.

In 1718, the source OS 1105, using the ICCID, EID_t, IMEI_t, retrieves a transfer token from the associated entitlement server. For example, see any of the operations 418, 520, 620, 714, 768, or 822 described above.

In 1720, the source OS 1105, using a display of the source 1102, displays the ICCID and transfer token in a QR code format. In 1722, the ICCID and transfer token displayed via the QR code are scanned by the target 1106. In 1724, the target OS 1107 parses the scanned QR code ICCID to identify the associated entitlement server address.

In 1726, the target OS 1107 consumes the transfer token from the entitlement server and SM-DP+. For example, see any of the operations 422, 524, 624, 720, 774, or 916 described above.

Figure 18:
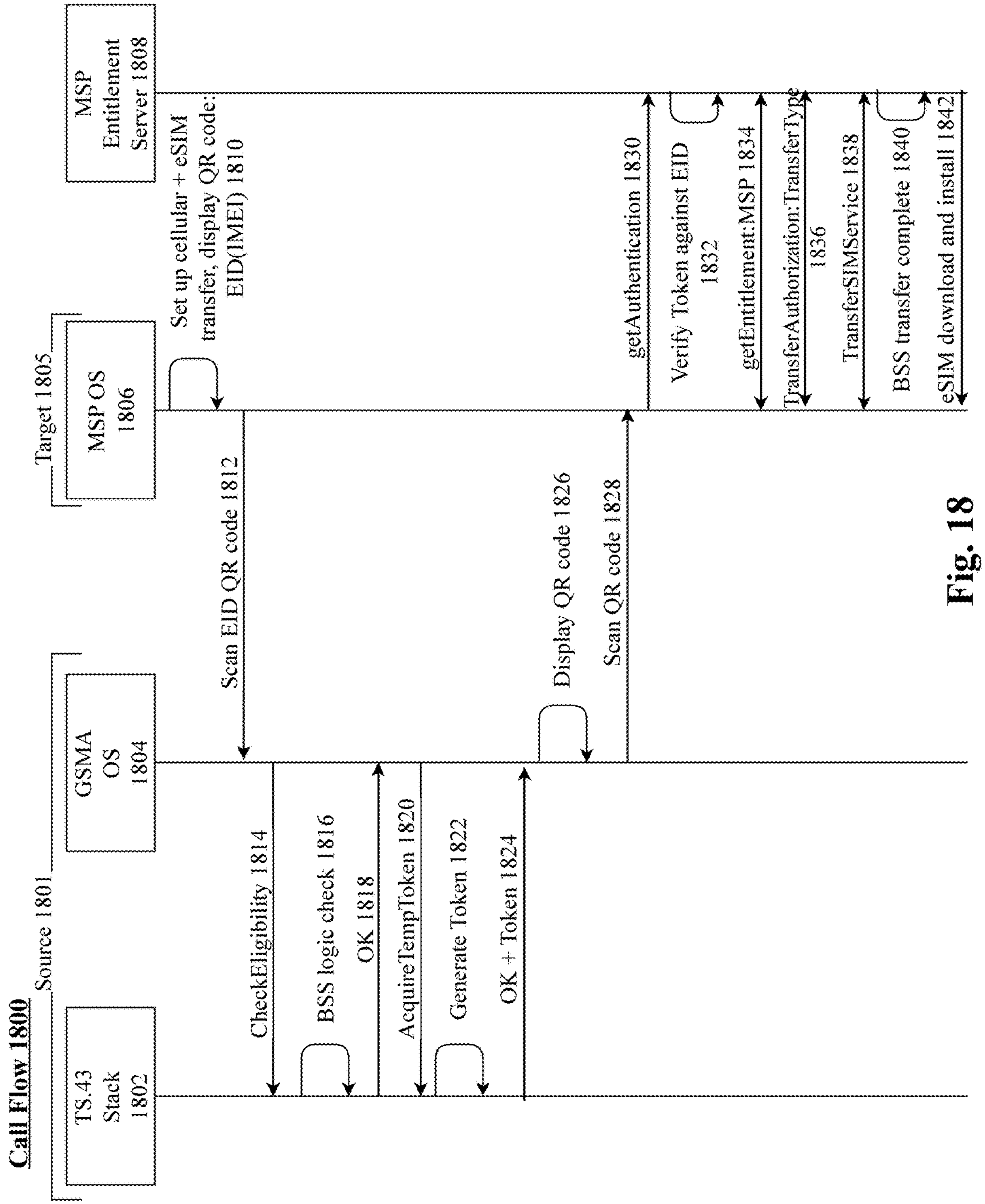
FIG. 18 shows an example call flow for a cross platform eSIM profile transfer from a source having a GSMA OS to a target having an MSP OS according to various example embodiments.

FIG. 18 shows an example call flow 1800 for a cross platform eSIM profile transfer from a source having a GSMA OS to a target having an MSP OS according to various example embodiments. The call flow 1800 includes a target 1801 having a TS.43 stack 1802 and a GSMA OS. The call flow 1800 also includes a source 1805 having an MSP OS 1806. Finally, the call flow 1800 also includes an MSP entitlement server 1808.

In 1810, the MSP OS 1806 performs setup operations for a cellular based eSIM profile transfer and displays a QR code containing an EID (e.g., IMEI).

In 1812, the target 1801 using a camera or other optical scanning device controlled by the GSMA OS 1804 scans the EID QR code, which triggers a cross-platform eSIM transfer flow at the GSMA OS 1804. In 1814, the GSMA OS 1804 transmits a check eligibility message to the TS.43 stack 1802, including source-device-information and target-device-information. In 1816, the TS.43 stack 1802 performs a logic check with the business support system of the carrier (not shown) to determine if the eSIM profile transfer is allowed. In 1818, if the check of 1816 is successful, the TS.43 stack 1802 transmits an OK message to the GSMA OS 1804, indicating that the eSIM transfer is allowed by the carrier.

In 1820, the GSMA OS 1804 transmits an acquire temporary token request to the TS.43 Stack 1802, including the target-EID. In 1822, the TS.43 stack 1802 contacts the carrier to obtain a temporary token for the eSIM profile transfer. In 1824, when the TS.43 stack 1802 successfully acquires the temporary token, the TS.43 stack 1802 transmits an OK message to the GSMA OS 1804, including the temporary token.

In 1826, the GSMA OS 1804 displays, on a display of the source 1801, a QR code including the temporary token, Mobile Country Code (MCC), Mobile Network Code (MNC), a first group identifier (GID1), a GID2, and the Mobile Station International Subscriber Directory Number (MSISDN).

In 1828, the target 1805 using a camera or other optical scanning device controlled by the MSP OS 1806 scans the QR code generated in 1826. In 1830, the MSP OS 1806 transmits a getAuthentication message to the MSP entitlement server 1808, including the temporary token, a cross platform indicator, and the target EID.

In 1832, the MSP entitlement server 1808 verifies the temporary token against the target EID. In 1834, the MSP entitlement server 1808 and the MSP OS 1806 perform a getEntitlement: MSP operation. In 1836, the MSP entitlement server 1808 and the MSP OS 1806 perform a TransferAuthorization:TransferType operation.

In 1838, the MSP entitlement server 1808 and the MSP OS 1806 perform a TransferSIMService operation. In 1840, the MSP entitlement server 1808 confirms that the BSS transfer has been completed between the source and target (e.g., the GSMA OS 1804 and the MSP OS 1806).

In 1842, the MSP entitlement server 1808 transmits the eSIM profile to the MSP OS 1806, which installs the eSIM profile.

EXAMPLES

In a first example, a method comprising engaging in an embedded subscriber identity module (eSIM) profile transfer process to transfer an eSIM profile from a source device executing a first operating system (OS) that implements a first protocol stack related to eSIM profile transfers to a target device executing a second OS that implements a second protocol stack related to eSIM profile transfers, wherein the first protocol stack and the second protocol stack are different, processing, based on signaling received from an entitlement server, a token for transferring the eSIM profile and generating, for transmission to the target device, a message comprising the token.

In a second example, the method of the first example, wherein the first protocol stack comprises a standardized protocol stack, the second protocol stack comprises a manufacturer specific protocol (MSP) stack and the token comprises a temporary token generated by the standardized protocol stack of the entitlement server, wherein the temporary token comprises an expiration time.

In a third example, the method of the first example, wherein the first protocol stack comprises a manufacturer specific protocol (MSP) stack, the second protocol stack comprises a standardized protocol stack and the token comprises a transfer token generated by the MSP stack of the entitlement server, wherein the transfer token comprises an expiration time.

In a fourth example, the method of the first example, further comprising establishing a secure tunnel via a wireless communication connection with the target device.

In a fifth example, the method of the fourth example, further comprising processing, based on signaling received from the target device via the secure tunnel, a message comprising an International Mobile Equipment Identity (IMEI) of the target device, an embedded identity document (EID) of the target device, and a platform type of the target device, wherein the platform type corresponds to the second OS, determining a server nonce associated with the entitlement server, calculating a blob comprising the server nonce, signing the blob to create a signed blob and generating, for transmission to the entitlement server, a request for the token comprising the signed blob.

In a sixth example, the method of the fifth example, wherein the processing circuitry is configured to hash an authentication token received from the entitlement server to determine the server nonce.

In a seventh example, the method of the fifth example, wherein the processing circuitry is configured to retrieve the server nonce, using an application programming interface (API), from the entitlement server to determine the server nonce.

In an eighth example, the method of the fifth example, wherein the blob further comprises (i) the IMEI of the target device, (ii) the EID of the target device, (iii) the platform type of the target device, (iv) an IMEI of the source device, (v) an EID of the source device, (vi) a platform type of the source device and (vii) a user intent level comprising a level of authentication used for transferring the eSIM profile.

In a ninth example, the method of the eighth example, wherein the blob is allowed to be signed when a user authentication performed by the source device is successful, wherein the user authentication comprises biometric input by a user or passcode input by the user.

In a tenth example, the method of the fifth example, wherein the blob further comprises an Integrated Circuit Card Identification Number (ICCID) of the eSIM profile, wherein the blob is allowed to be signed by an embedded Universal Integrated Circuit Card (eUICC) of the source device when the eUICC verifies the eSIM profile having the ICCID is installed on the eUICC.

In an eleventh example, the method of the fifth example, wherein the token comprises an indication of a platform type of the source device.

In a twelfth example, the method of the fifth example, further comprising processing, based on signaling received from the entitlement server, a request for further authentication of the source device, wherein the request comprises a uniform resource location (URL) for the source device to access for the further authentication.

In a thirteenth example, the method of the fifth example, wherein the token comprises a representation of the EID of the target device.

In a fourteenth example, the method of the fourth example, wherein the processing circuitry executes a third party application to perform at least some operations of the eSIM profile transfer process.

In a fifteenth example, the method of the fourteenth example, further comprising, prior to establishing the secure tunnel, performing a discovery process via the third party application with the target device to determine the eSIM profile transfer process is to be performed with the target device and processing, by the third party application, a setup start message from the target device comprising a target public key of the target device.

In a sixteenth example, the method of the fifteenth example, wherein the discovery process is performed via a short-range communication connection or a scan of an optical code.

In a seventeenth example, the method of the fifteenth example, wherein the discovery process comprises configuring transceiver circuitry to scan for an advertisement from the target device, wherein the advertisement comprises a beacon or configuring transceiver circuitry to transmit the advertisement comprising the beacon.

In an eighteenth example, the method of the seventeenth example, wherein the beacon comprises a length field indicating a length of the beacon, a tag field comprising a beacon indicator, a version field indicating a protocol version of the first protocol stack or second protocol stack; a device type field indicating a type of the source device or target device; a platform field indicating an identity of the first OS or second OS or a role field indicating a role the source device or target device will perform during the eSIM transfer process.

In a nineteenth example, the method of the fifteenth example, further comprising generating, using the third party application, a source public key and source private key pair, processing, using the third party application, user input comprising a personal identification number (PIN) associated with the target device, generating, using the third party application, a session key comprising a hash of the PIN and the source public key, generating, by the third party application for transmission to the target device, a setup verify message comprising the session key, and processing, using the third party application, encrypted information from the target device to be used to establish the secure tunnel.

In a twentieth example, the method of the fifteenth example, further comprising processing, using the third party application, user input comprising a personal identification number (PIN) associated with the target device, generating, using the third party application, a symmetric key, generating, by the third party application for transmission to the target device, a setup verify message comprising the PIN and the symmetric key encrypted using the target public key, and processing, using the third party application, encrypted information from the target device to be used to establish the secure tunnel.

In a twenty first example, the method of the fourteenth example, further comprising retrieving, by the third party application from the first OS, phone numbers and other data associated with the eSIM profile.

In a twenty second example, the method of the twenty first example, further comprising processing, using the third party application, user input comprising a selection of a subset of the phone numbers and other data that is to be migrated to the target device during the eSIM transfer process.

In a twenty third example, the method of the twenty first example, further comprising generating, using the third party application for transmission to the target device, the phone numbers and other data associated with the eSIM profile and processing, using the third party application, a selection from the target device comprising a subset of the phone numbers and other data that is to be migrated to the target device during the eSIM transfer process.

In a twenty fourth example, the method of the fourteenth example, further comprising sending, from the third party application to the first OS, a transfer token request application programming interface (API) comprising an Integrated Circuit Card Identification Number (ICCID) of the eSIM profile, an International Mobile Equipment Identity (IMEI) of the target device, and an embedded identity document (EID) of the target device, wherein the first OS uses the transfer token request API to request the token from the entitlement server, processing, by the third party application based on signaling received from the first OS, the token, wherein the third party application configures the transceiver circuitry to transmit the token to the target device, processing, using the third party application, a transfer completed message from the target device indicating the eSIM profile has been successfully transferred to the target device, sending, by the third party application to the first OS, the transfer completed message and processing, by the third party application based on signaling received from the first OS, an acknowledgement message indicating operations related to the eSIM transfer process performed by the first OS are complete.

In a twenty fifth example, the method of the fourteenth example, further comprising sending, from the third party application to the first OS, an eSIM transfer request application programming interface (API) comprising an Integrated Circuit Card Identification Number (ICCID) of the eSIM profile, an International Mobile Equipment Identity (IMEI) of the target device, an embedded identity document (EID) of the target device, and information to establish a short-range connection with the target device, wherein the first OS uses the eSIM transfer request API to request the token from the entitlement server, establishing, by the first OS, the short-range connection with the target device using the information, wherein the first OS configures the transceiver circuitry to transmit the token to the target device via the short-range connection, processing, using the first OS based on signaling received from the target device, a transfer completed message indicating the eSIM profile has been successfully transferred to the target device, performing, by the first OS, operations related to completing the eSIM transfer process and sending, by the first OS to the third party application, an acknowledgement message indicating the operations related to completing the eSIM transfer process are complete.

In a twenty sixth example, the method of the fourth example, wherein the first OS performs operations of the eSIM profile transfer process.

In a twenty seventh example, the method of the twenty sixth example, further comprising, prior to establishing the secure tunnel, performing a discovery process with the target device to determine the eSIM profile transfer process is to be performed with the target device and processing, based on signaling received from the target device, a setup start message comprising a target private key of the target device.

In a twenty eighth example, the method of the twenty seventh example, wherein the discovery process is performed via a short-range communication connection or a scan of an optical code.

In a twenty ninth example, the method of the twenty seventh example, wherein the discovery process comprises configuring transceiver circuitry to scan for an advertisement from the target device, wherein the advertisement comprises a beacon or configuring transceiver circuitry to transmit the advertisement comprising the beacon.

In a thirtieth example, the method of the twenty ninth example, wherein the beacon comprises a length field indicating a length of the beacon, a tag field comprising a beacon indicator, a version field indicating a protocol version of the first protocol stack or second protocol stack; a device type field indicating a type of the source device or target device; a platform field indicating an identity of the first OS or second OS or a role field indicating a role the source device or target device will perform during the eSIM transfer process.

In a thirty first example, the method of the twenty seventh example, further comprising generating a source public key and source private key pair, processing user input comprising a personal identification number (PIN) associated with the target device, generating a session key comprising a hash of the PIN and the source public key, generating, for transmission to the target device, a setup verify message comprising the session key, and processing, based on signaling received from the target device, encrypted information to be used to establish the secure tunnel.

In a thirty second example, the method of the twenty seventh example, further comprising processing user input comprising a personal identification number (PIN) associated with the target device, generating a symmetric key, generating, for transmission to the target device, a setup verify message comprising the PIN and the symmetric key encrypted using the target public key, and processing, based on signaling received from the target device, encrypted information to be used to establish the secure tunnel.

In a thirty third example, the method of the twenty sixth example, further comprising processing user input comprising a selection of phone numbers and other data that is to be migrated to the target device during the eSIM transfer process.

In a thirty fourth example, the method of the twenty sixth example, further comprising generating, for transmission to the target device, phone numbers and other data associated with the eSIM profile and processing, based on signaling received from the target device, a selection comprising a subset of the phone numbers and other data that is to be migrated to the target device during the eSIM transfer process.

In a thirty fifth example, the method of the twenty sixth example, further comprising establishing a short-range connection with the target device using the information, wherein the first OS configures the transceiver circuitry to transmit the token to the target device via the short-range connection, processing, based on signaling received from the target device, a transfer completed message indicating the eSIM profile has been successfully transferred to the target device and performing operations related to completing the eSIM transfer process.

In a thirty sixth example, the method of the first example, wherein a third party application performs at least some operations of the eSIM profile transfer process, wherein the method further comprises processing, using the third party application, user input comprising a selection of the eSIM profile that is to be transferred to the target device and configuring, using the third party application, a display of the source device to display an optical code comprising an indication of an Integrated Circuit Card Identification Number (ICCID) of the eSIM profile, a carrier identifier of the eSIM profile or the token.

In a thirty seventh example, the method of the first example, wherein a third party application performs at least some operations of the eSIM profile transfer process, wherein the method further comprises configuring, using the third party application, an optical scanning component of the source device to scan a first optical code displayed by the target device, the first optical code comprising an International Mobile Equipment Identity (IMEI) of the target device and an embedded identity document (EID) of the target device, sending, from the third party application to the first OS, a transfer token request application programming interface (API) comprising an Integrated Circuit Card Identification Number (ICCID) of the eSIM profile, the IMEI of the target device, and the EID of the target device, wherein the first OS uses the transfer token request API to request the token from the entitlement server, and configuring, using the first OS, a display of the source device to display a second optical code comprising an indication of the ICCID of the eSIM profile and the token.

In a thirty eighth example, the method of the first example, wherein the first OS performs operations of the eSIM profile transfer process, wherein the method further comprises processing user input comprising a selection of the eSIM profile that is to be transferred to the target device and configuring a display of the source device to display an optical code comprising an indication of an Integrated Circuit Card Identification Number (ICCID) of the eSIM profile, a carrier identifier of the eSIM profile or the token.

In a thirty ninth example, the method of the first example, wherein the first OS performs operations of the eSIM profile transfer process, wherein the method further comprises configuring an optical scanning component of the source device to scan a first optical code displayed by the target device, the first optical code comprising an International Mobile Equipment Identity (IMEI) of the target device and an embedded identity document (EID) of the target device, wherein the source device uses the IMEI of the target device and the EID of the target device to request the token from the entitlement server, and configuring a display of the source device to display a second optical code comprising an indication of an Integrated Circuit Card Identification Number (ICCID) of the eSIM profile and the token.

In a fortieth example, a processor configured to perform any of the methods of the first through thirty ninth examples.

In a forty first example, a user equipment (UE) configured to perform any of the methods of the first through thirty ninth examples.

Those skilled in the art will understand that the above-described example embodiments may be implemented in any suitable software or hardware configuration or combination thereof. An example hardware platform for implementing the example embodiments may include, for example, an Intel x86 based platform with compatible operating system, a Windows OS, a Mac platform and MAC OS, a mobile device having an operating system such as iOS, Android, etc. The example embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. An apparatus comprising processing circuitry configured to:

engage in an embedded subscriber identity module (eSIM) profile transfer process to transfer an eSIM profile from a source device executing a first operating system (OS) that implements a first protocol stack related to eSIM profile transfers to a target device executing a second OS that implements a second protocol stack related to eSIM profile transfers, wherein the first protocol stack and the second protocol stack are different;

process, based on signaling received from an entitlement server, a token for transferring the eSIM profile; and generate, for transmission to the target device, a message comprising the token.

2. The apparatus of claim 1, wherein the first protocol stack comprises a standardized protocol stack, the second protocol stack comprises a manufacturer specific protocol (MSP) stack and the token comprises a temporary token generated by the standardized protocol stack of the entitlement server, wherein the temporary token comprises an expiration time.

3. The apparatus of claim 1, wherein the first protocol stack comprises a manufacturer specific protocol (MSP) stack, the second protocol stack comprises a standardized protocol stack and the token comprises a transfer token generated by the MSP stack of the entitlement server, wherein the transfer token comprises an expiration time.

4. The apparatus of claim 1, wherein the processing circuitry is further configured to:

establish a secure tunnel via a wireless communication connection with the target device.

5. The apparatus of claim 4, wherein the processing circuitry executes a third party application to perform at least some operations of the eSIM profile transfer process.

6. The apparatus of claim 5, wherein the processing circuitry is further configured to:

prior to establishing the secure tunnel, perform a discovery process via the third party application with the target device to determine the eSIM profile transfer process is to be performed with the target device; and process, by the third party application, a setup start message from the target device comprising a target public key of the target device.

7. The apparatus of claim 6, wherein the discovery process is performed via a short-range communication connection or a scan of an optical code.

8. The apparatus of claim 6, wherein the discovery process comprises the processing circuitry configured to:

configure transceiver circuitry to scan for an advertisement from the target device, wherein the advertisement comprises a beacon; or configure the transceiver circuitry to transmit the advertisement comprising the beacon.

9. The apparatus of claim 8, wherein the beacon comprises a length field indicating a length of the beacon, a tag field comprising a beacon indicator, a version field indicating a protocol version of the first protocol stack or second protocol stack; a device type field indicating a type of the source device or target device; a platform field indicating an identity of the first OS or second OS or a role field indicating a role the source device or target device will perform during the eSIM transfer process.

10. The apparatus of claim 6, wherein the processing circuitry is further configured to:

generate, using the third party application, a source public key and source private key pair;

process, using the third party application, user input comprising a personal identification number (PIN) associated with the target device;

generate, using the third party application, a session key comprising a hash of the PIN and the source public key;

generate, by the third party application for transmission to the target device, a setup verify message comprising the session key; and process, using the third party application, encrypted information from the target device to be used to establish the secure tunnel.

11. The apparatus of claim 6, wherein the processing circuitry is further configured to:

process, using the third party application, user input comprising a personal identification number (PIN) associated with the target device;

generate, using the third party application, a symmetric key;

generate, by the third party application for transmission to the target device, a setup verify message comprising the PIN and the symmetric key encrypted using the target public key; and process, using the third party application, encrypted information from the target device to be used to establish the secure tunnel.

12. The apparatus of claim 5, wherein the processing circuitry is further configured to:

retrieve, by the third party application from the first OS, phone numbers and other data associated with the eSIM profile.

13. The apparatus of claim 12, wherein the processing circuitry is further configured to:

process, using the third party application, user input comprising a selection of a subset of the phone numbers and other data that is to be migrated to the target device during the eSIM transfer process.

14. The apparatus of claim 12, wherein the processing circuitry is further configured to:

generate, using the third party application for transmission to the target device, the phone numbers and other data associated with the eSIM profile; and process, using the third party application, a selection from the target device comprising a subset of the phone numbers and other data that is to be migrated to the target device during the eSIM transfer process.

15. The apparatus of claim 5, wherein the processing circuitry is further configured to:

send, from the third party application to the first OS, a transfer token request application programming interface (API) comprising an Integrated Circuit Card Identification Number (ICCID) of the eSIM profile, an International Mobile Equipment Identity (IMEI) of the target device, and an embedded identity document (EID) of the target device, wherein the first OS uses the transfer token request API to request the token from the entitlement server;

process, by the third party application based on signaling received from the first OS, the token, wherein the third party application configures transceiver circuitry to transmit the token to the target device;

process, using the third party application, a transfer completed message from the target device indicating the eSIM profile has been successfully transferred to the target device;

send, by the third party application to the first OS, the transfer completed message; and process, by the third party application based on signaling received from the first OS, an acknowledgement message indicating operations related to the eSIM transfer process performed by the first OS are complete.

16. The apparatus of claim 5, wherein the processing circuitry is further configured to:

send, from the third party application to the first OS, an eSIM transfer request application programming interface (API) comprising an Integrated Circuit Card Identification Number (ICCID) of the eSIM profile, an International Mobile Equipment Identity (IMEI) of the target device, an embedded identity document (EID) of the target device, and information to establish a short-range connection with the target device, wherein the first OS uses the eSIM transfer request API to request the token from the entitlement server;

establish, by the first OS, the short-range connection with the target device using the information, wherein the first OS configures transceiver circuitry to transmit the token to the target device via the short-range connection;

process, using the first OS based on signaling received from the target device, a transfer completed message indicating the eSIM profile has been successfully transferred to the target device;

perform, by the first OS, operations related to completing the eSIM transfer process; and send, by the first OS to the third party application, an acknowledgement message indicating the operations related to completing the eSIM transfer process are complete.

17. A method, comprising:

engaging in an embedded subscriber identity module (eSIM) profile transfer process to transfer an eSIM profile from a source device executing a first operating system (OS) that implements a first protocol stack related to eSIM profile transfers to a target device executing a second OS that implements a second protocol stack related to eSIM profile transfers, wherein the first protocol stack and the second protocol stack are different;

processing, based on signaling received from an entitlement server, a token for transferring the eSIM profile;

generating, for transmission to the target device, a message comprising the token; and establishing a secure tunnel via a wireless communication connection with the target device.

18. The method of claim 17, wherein a third party application performs at least some operations of the eSIM profile transfer process.

19. The method of claim 18, further comprising:

prior to establishing the secure tunnel, performing a discovery process via the third party application with the target device to determine the eSIM profile transfer process is to be performed with the target device; and processing, by the third party application, a setup start message from the target device comprising a target public key of the target device.

20. The method of claim 19, wherein the discovery process comprises:

configuring transceiver circuitry to scan for an advertisement from the target device, wherein the advertisement comprises a beacon; or configuring the transceiver circuitry to transmit the advertisement comprising the beacon.

* * * * *